United States Patent
Yan et al.

(10) Patent No.: US 11,855,946 B2
(45) Date of Patent: Dec. 26, 2023

(54) MESSAGE TRANSMISSION METHOD, MESSAGE RECEIVING METHOD, APPARATUS, DEVICE, AND MEDIUM

(71) Applicant: Tencent Technology (Shenzhen) Company Limited, Shenzhen (CN)

(72) Inventors: Xi Yan, Shenzhen (CN); Wancheng Zhou, Shenzhen (CN); Qing Huang, Shenzhen (CN); Junjie Liang, Shenzhen (CN); Hongfa Qiu, Shenzhen (CN); Yanlan Liu, Shenzhen (CN); Runjia Huang, Shenzhen (CN); Qiuchen Jin, Shenzhen (CN); Zhihao Chen, Shenzhen (CN); Xucheng Tang, Shenzhen (CN); Bohan Cai, Shenzhen (CN); Jingqiong Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/867,600

(22) Filed: Jul. 18, 2022

(65) Prior Publication Data
US 2022/0353229 A1  Nov. 3, 2022

Related U.S. Application Data

(63) Continuation of application No. PCT/CN2021/097615, filed on Jun. 1, 2021.

(30) Foreign Application Priority Data

Jun. 29, 2020 (CN) .......................... 202010603972.5

(51) Int. Cl.
G06F 15/16 (2006.01)
H04L 51/224 (2022.01)
(Continued)

(52) U.S. Cl.
CPC ............ *H04L 51/224* (2022.05); *H04L 51/04* (2013.01); *H04L 51/52* (2022.05)

(58) Field of Classification Search
CPC ........ H04L 51/224; H04L 51/52; H04L 51/04
(Continued)

(56) References Cited

U.S. PATENT DOCUMENTS 8,843,573 B2 * 9/2014 Cuervo ................. H04L 51/222
709/224
10,897,370 B1 * 1/2021 Schemers .............. G06Q 50/01
(Continued)

FOREIGN PATENT DOCUMENTS

CN  104461299 A  3/2015

OTHER PUBLICATIONS

Johnson, Luke. "17 Things You'll Only Remember If You Were an MSN Messenger Addict." DigitalSpy, Oct. 31, 2016, https://www.digitalspy.com/tech/a802121/17-things-youll-only-remember-if-you-were-a-full-msn-messenger-addict-from-appearing-offline-to-song-lyric-statuses/. (Year: 2016).*
(Continued)

*Primary Examiner* — Kaylee J Huang
(74) *Attorney, Agent, or Firm* — Morgan, Lewis & Bockius LLP

(57) ABSTRACT

A first device is logged in with a first user account. The first device displays an avatar of a second user account in a first user interface of the first device. In response to an interaction instruction triggered on the avatar of the second user account, the first device generates an interaction message according to a first field corresponding to the first user account, an action description field used for indicating an action performed by the first user account on the second user account, and a second field corresponding to the second user account. The first device transmits the interaction message to
(Continued)

a second device that is logged in with the second user account.

18 Claims, 22 Drawing Sheets

(51) Int. Cl.
   *H04L 51/52* (2022.01)
   *H04L 51/04* (2022.01)
(58) Field of Classification Search
   USPC .................................. 709/206, 204, 207, 217
   See application file for complete search history.

(56) References Cited

U.S. PATENT DOCUMENTS

| | | | | |
|---|---|---|---|---|
| 2009/0134982 | A1* | 5/2009 | Robertson | G08B 27/005 340/326 |
| 2010/0203904 | A1* | 8/2010 | Khokhlov | G06F 3/0481 455/457 |
| 2013/0097093 | A1* | 4/2013 | Kolber | G06Q 10/1053 705/321 |
| 2017/0201478 | A1* | 7/2017 | Joyce | H04L 51/214 |
| 2017/0214651 | A1* | 7/2017 | McMichael | H04L 51/224 |
| 2018/0300161 | A1 | 10/2018 | Landowski et al. | |
| 2020/0204513 | A1* | 6/2020 | Li | G06F 3/04886 |
| 2021/0336911 | A1* | 10/2021 | Naoi | G06F 13/00 |

OTHER PUBLICATIONS

Guangming Daily, "WeChat—'Take a Shot', Is It Useful?", Jun. 22, 2020, 6 pgs., Retrieved from the Internet: https://baijiahao.baidu.com/s?id=1670127431859829388&wfr=spider&for=pc.

Tencent Technology, ISR, PCT/CN2021/097615, Aug. 9, 2021, 2 pgs.

"What Does it Mean to Take a Pat on WeChat? How to Use the Function of Taking a Pat on WeChat?", Jun. 22, 2020, 4 pgs., Retrieved from the Internet: https://www.hxnews.com/news/yl/ylxw/202006/22/1906694.shtml.

Tencent Technology, WO, PCT/CN2021/097615, Aug. 9, 2021, 4 pgs.

Tencent Technology, IPRP, PCT/CN2021/097615, Dec. 13, 2022, 5 pgs.

* cited by examiner

MESSAGE TRANSMISSION METHOD, MESSAGE RECEIVING METHOD, APPARATUS, DEVICE, AND MEDIUM

CROSS-REFERENCE TO RELATED APPLICATIONS

This application is a continuation application of PCT Patent Application No. PCT/CN2021/097615, entitled "MESSAGE SENDING METHOD AND APPARATUS, MESSAGE RECEIVING METHOD AND APPARATUS, DEVICE, AND MEDIUM" filed on Jun. 1, 2021, which claims priority to Chinese Patent Application No. 202010603972.5, filed with the State Intellectual Property Office of the People's Republic of China on Jun. 29, 2020, and entitled "MESSAGE TRANSMISSION METHOD, MESSAGE RECEIVING METHOD, APPARATUS, DEVICE, AND MEDIUM", all of which are incorporated herein by reference in their entirety.

FIELD OF THE TECHNOLOGY

Embodiments of this application relate to the field of computer technologies, and in particular, to a message transmission method, message receiving method, apparatus, device, and medium.

BACKGROUND OF THE DISCLOSURE

Instant messaging programs provide a private chat function and a group chat function. The private chat function is a chat function between two user accounts, and the group chat function is a chat function between multiple (e.g., more than two) user accounts.

Taking the group chat function as an example, when user account A intends to interact with user account B in a group chat, user account A may send a group chat message starting with "@user account B". In this case, user account B receives a reminder to view the group chat message.

SUMMARY

Embodiments of this application provide a message transmission method, message receiving method, apparatus, device, and medium. The technical solutions are as follows.

According to an aspect of this application, a message transmission method is provided, applicable to a first device (e.g., a first client device), the first device is logged in with a first user account, the method including:
  displaying an avatar of a second user account in a first user interface;
  generating, in response to an interaction instruction triggered on the avatar of the second user account, an interaction message according to a first field corresponding to the first user account, an action description field used for indicating an action performed by the first user account on the second user account, and a second field corresponding to the second user account; and
  transmitting the interaction message to a second device (e.g., second client) that is logged in with the second user account.

According to another aspect of this application, a message receiving method is provided, applicable to a second device (e.g., second client), the second device being logged in with a second user account, the method including:
  displaying a second chat window interface, chat members in the second chat window interface including a first user account and the second user account;
  receiving an interaction message transmitted by the first user account to the second user account, a message content of the interaction message including: a first field corresponding to the first user account, an action description field used for indicating an action performed by the first user account on the second user account, and a second field corresponding to the second user account; and
  displaying the interaction message in the second chat window interface.

According to another aspect of this application, a message transmission apparatus is provided, the apparatus being logged in with a first user account, the apparatus including:
  a display module, configured to display an avatar of a second user account in a first user interface;
  a generation module, configured to generate, in response to an interaction instruction triggered on the avatar of the second user account, an interaction message according to a first field corresponding to the first user account, an action description field used for indicating an action performed by the first user account on the second user account, and a second field corresponding to the second user account; and
  a transmission module, configured to transmit the interaction message to a second client logged in with the second user account.

According to another aspect of this application, a message receiving apparatus is provided, the apparatus being logged in with a second user account, the apparatus including:
  a display module, configured to display a second chat window interface, chat members in the second chat window interface including a first user account and the second user account; and
  a receiving module, configured to receive an interaction message transmitted by the first user account to the second user account, a message content of the interaction message including: a first field corresponding to the first user account, an action description field used for indicating an action performed by the first user account on the second user account, and a second field corresponding to the second user account,
  the display module being further configured to display the interaction message in the second chat window interface.

According to another aspect of this application, a computer device (e.g., an electronic device) is provided, including a processor and a memory, the memory storing at least one instruction, at least one program, a code set or an instruction set, the at least one instruction, the at least one program, the code set or the instruction set being loaded and executed by the processor to implement the message transmission method or the message receiving method according to the above aspects.

According to another aspect of this application, a non-transitory computer-readable storage medium is provided, the computer-readable storage medium storing at least one instruction, at least one program, a code set or an instruction set, the at least one instruction, the at least one program, the code set or the instruction set being loaded and executed by a processor to implement the message transmission method or the message receiving method according to the above aspects.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following descriptions show merely some embodiments of this application, and a person of ordinary skill in the art may obtain other accompanying drawings according to these accompanying drawings without creative efforts.

FIG. 7A and FIG. 7B are interface schematic diagrams of a group member display interface (group chat details page) according to an exemplary embodiment of this application.

DESCRIPTION OF EMBODIMENTS

To make objectives, technical solutions, and advantages of this application clearer, the following further describes implementations of this application in detail with reference to the accompanying drawings.

In existing instant messaging programs, an interaction through "@user account" may cause a strong reminder to the reminded user, and it may not be reasonable to use the strong reminder function in some scenarios. Therefore, the embodiments of this application provide a message interaction manner with a light reminder function, and a corresponding method, apparatus, device, and the like for transmitting and receiving light interaction messages.

Figure 1:
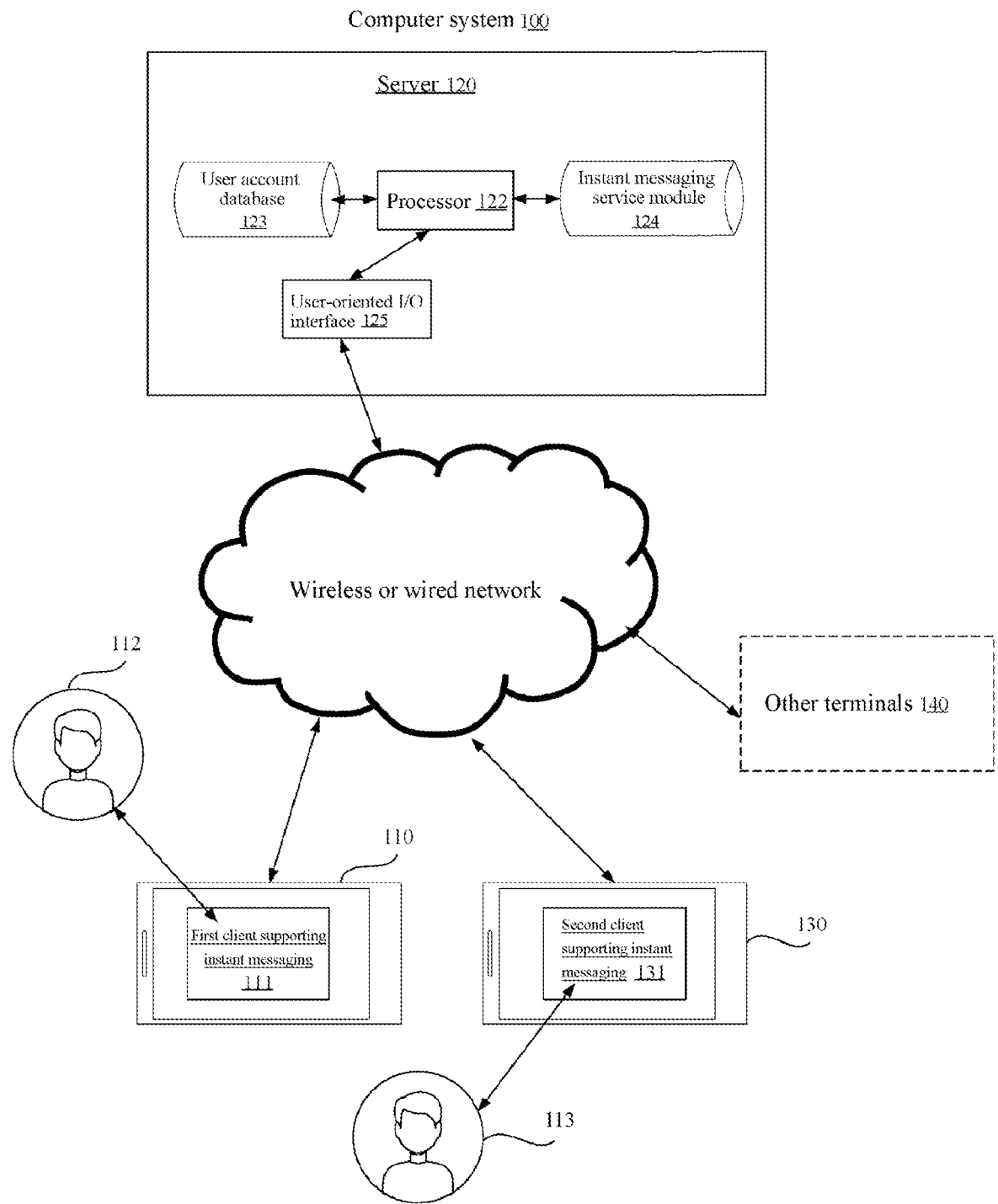
FIG. 1 is a structural block diagram of a computer system according to an exemplary embodiment of this application.

FIG. 1 is a structural block diagram of a computer system according to an exemplary embodiment of this application. The computer system 100 includes a first terminal 110, a server 120, and a second terminal 130.

The first terminal 110 (e.g., an electronic device, a client device, a computing device, etc.) is installed with and runs a first client 111 that supports instant messaging (e.g., an instant messaging application). The first client 111 may be an application or a web client with an instant messaging function. When the first terminal 110 runs the first client 111, a user interface of the first client 111 is displayed on a screen of the first terminal 110. The first terminal 110 is a terminal used by a first user 112, and the first client 111 is logged in with a first user account of the first user 112. The second terminal 130 is installed with and runs a second client 131 that supports instant messaging. The second client 131 may be an application or a web client with an instant messaging function. When the second terminal 130 runs the second client 131, a user interface of the second client 131 is displayed on a screen of the second terminal 130. The second terminal 130 is a terminal used by a second user 113, and the second client 131 is logged in with a second user account of the second user 113. The application may be any one of an instant messaging program, a microblog program, a voice calling program, a conference program, an online community program, a payment program, a shopping program, a dating program, or a match-making program. In the embodiments of this application, for example, the application is an instant messaging program.

For example, the applications installed on the first terminal 110 and the second terminal 130 are the same, or the applications installed on the two terminals are the same type of applications on different operating system platforms (Android system or iOS system). The first terminal 110 may generally refer to one of a plurality of terminals, and the second terminal 130 may generally refer to another one of the plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer.

FIG. 1 shows only two terminals. However, a plurality of other terminals 140 may access the server 120 in different embodiments. For example, one or more terminals 140 are terminals corresponding to a developer. A developing and editing platform for the client supporting instant messaging is installed on the terminal 140. The developer may edit and update the client on the terminal 140 and transmit an updated application installation package to the server 120 by using a wired or wireless network. The first terminal 110 and the second terminal 130 may download the application installation package from the server 120 to update the client.

The first terminal 110, the second terminal 130, and the terminal 140 are connected to the server 120 through a wireless network or a wired network.

The server 120 can include one server, a plurality of servers, a cloud computing platform, and/or a virtualization center. The server 120 is configured to provide a background service for a client supporting instant messaging. For example, the server 120 is responsible for primary computing work, and the terminal is responsible for secondary computing work; or the server 120 is responsible for secondary computing work, and the terminal is responsible for primary computing work; or a distributed computing architecture is adopted between the server 120 and the terminal to perform collaborative computing.

In a schematic example, the server 120 includes a processor 122, a user account database 123, an instant messaging service module 124, and a user-oriented input/output (I/O) interface 125. The processor 122 is configured to load instructions stored in the server 120, and process data in the user account database 123 and the instant messaging service module 124. The user account database 123 is configured to store data of user accounts used by the first terminal 110, the second terminal 130, and the terminal 140, for example, avatars of the user accounts, nicknames of the user accounts, groups to which the user accounts belong, etc. The instant messaging service module 124 is configured to provide multiple chat rooms (two-person chat or multi-person chat) for users to chat, send emoticons, send red envelopes, etc. for instant messaging. The user-oriented I/O interface 125 is configured to establish communication between the first terminal 110 and/or the second terminal 130 by using a wireless network or a wired network for data exchange.

The following describes the message transmission (or receiving) method provided by the embodiments of this application with reference to the description of the structure of the computer system. The method is executed by, for example, a client running on a terminal shown in FIG. 1. The terminal runs a client, which is an application supporting instant messaging.

Figures 2A, 2B:
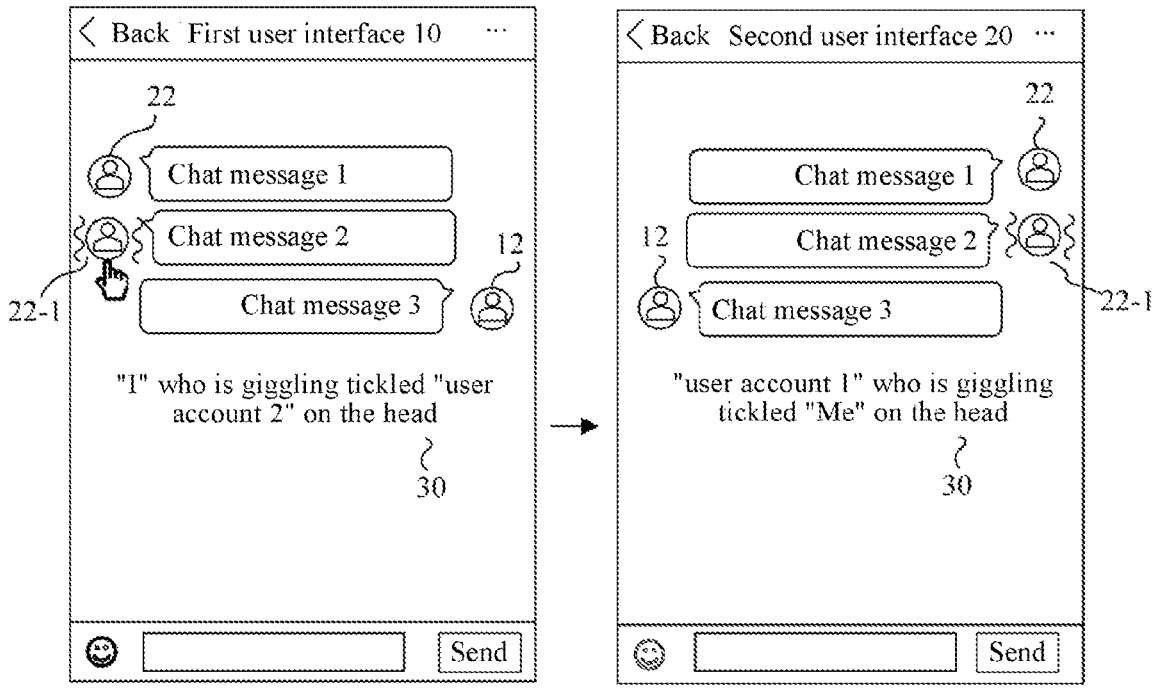
FIG. 2A and FIG. 2B are schematic interface diagrams of a light interaction message according to an embodiment of this application.

FIG. 2A and FIG. 2B illustrate a first user interface 10 of the first client 111 (e.g., running on a terminal) and a second user interface 20 of the second client 131 (e.g., running on another terminal). The first client 111 is logged in with a first user account, and the second client 131 is logged in with a second user account. The first user account and the second user account may send and receive chat messages in a chat window interface of a two-person chat (one-to-one chat, also called a single chat or private chat) or a chat window interface of a multi-person group chat. As shown in FIG. 2A and FIG. 2B, the first user interface 10 and the second user interface 20 are chat window interfaces of a two-person chat. On the first user interface 10 and the second user interface 20, an avatar 12 of the first user account, an avatar 22 of the second user account, and chat messages between the first user account and the second user account, including the chat message 1, 2, 3 are displayed.

As shown in FIG. 2A and FIG. 2B, when the first user double-taps an avatar (not shown, which is the same as the avatar 22 of the second user account) of the second user account corresponding to the chat message 2 on the first user interface 10, the avatar of the second user account corresponding to the chat message 2 on the first user interface 10 and the second user interface 20 is displayed as an avatar animation 22-1 (as an example), and at the same time a light interactive message 30 is displayed in each of the first user interface 10 and the second user interface 20.

The light interactive message 30 is a message different from a chat message. For example, the light interactive message 30 includes message content that is assembled by the client itself. The message content of the light interactive message 30 includes: a first field corresponding to the first user account, an action description field used for indicating an action performed by the first user account on the second user account, and a second field corresponding to the second user account. At least one of the first field, the action description field, and the second field is a custom field pre-edited by the user for the light interaction message.

For example, in the first user interface 10 of FIG. 2A and FIG. 2B, the message content of the light interactive message 30 is: "I" who is giggling tickled "user account 2" on the head. In the second user interface 20, the message content of the light interactive message 30 is: "user account 1" who is giggling tickled "Me" on the head.

Figure 3:
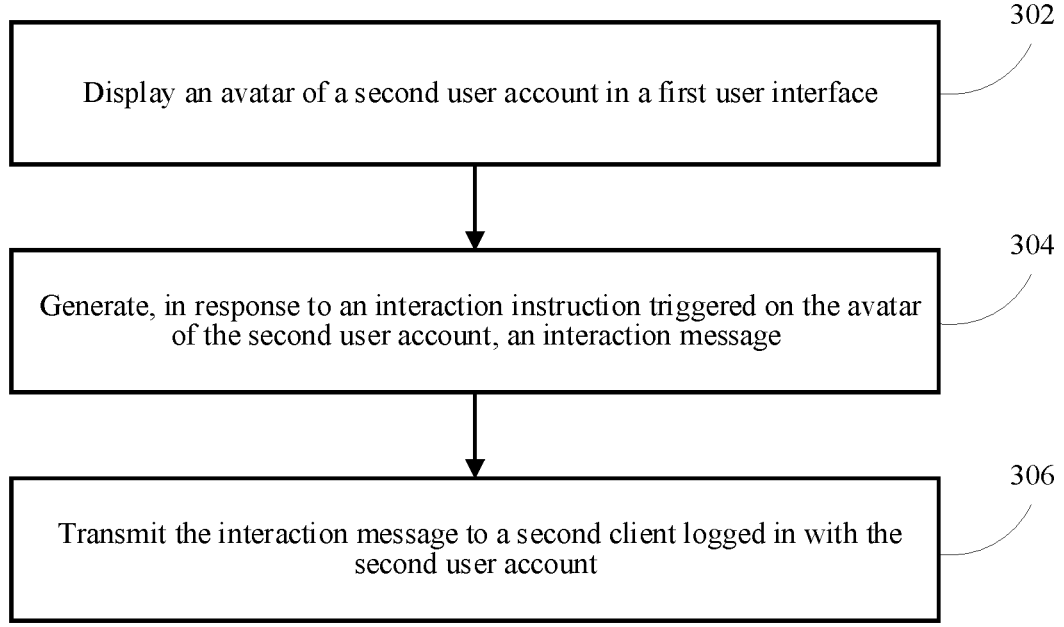
FIG. 3 is a method flowchart of a message transmission method according to an exemplary embodiment of this application.

FIG. 3 is a flowchart of a message transmission method according to an exemplary embodiment of this application. This embodiment is described using an example where the method is executed by the first client shown in FIG. 1. The first client logs in with a first user account. The method includes the following steps:

Step 302: Display an avatar of a second user account in a first user interface.

The first user interface is any user interface that displays the avatar of the second user account in the first client. For example, the first user interface is a non-chat window interface or a first chat window interface.

The non-chat window interface includes, for example, at least one of a personal attribute interface, an address book interface, a group member display interface, a single chat member display interface, or a social circle interaction interface. The first chat window interface is a user interface for chatting between the first user account and other user accounts. In some embodiments, the first chat window interface comprises a user interface that enables two persons (e.g., a first user corresponding to the first user account and a second user corresponding to the second user account) to chat (e.g., send text messages, video, images, etc.). In some embodiments, the first chat window interface comprises a chat window interface of a multi-person (e.g., more than two persons) group chat (e.g., chat between the first user account, the second user account, and one or more third user account(s)).

The first chat window interface may display a chat message list that is arranged in chronological order. In each chat message in the chat message list, an avatar of a user account as the sender and a message content of the chat message may be displayed. For example, each chat message further displays a remark name, a group nickname, or a custom nickname of the user account. The remark name is a name remarked to the current user account by other user accounts, the group nickname is a nickname defined by the current user account for itself in a group, and the custom nickname is a nickname defined by the current user account for itself in a client.

In some embodiments, the first user account and the second user account are different user accounts. In some other embodiments, the first user account and the second user account are the same user account.

Step 304: Generate an interaction message (e.g., interactive message) in response to an interaction instruction triggered on the avatar of the second user account.

The first user performs a trigger operation on the avatar of the second user account. The trigger operation may include at least one of a double-click operation, a double-tap operation, a single-tap operation, or a press-and-hold operation. In this embodiment, the interaction instruction is, for example, the double-tap instruction.

In some embodiments, the interaction is a light interaction. The interaction instruction is a light interaction instruction, and the interaction message is a light interaction message. The light interaction is compared to a conventional interaction through "@user account," which causes a stronger reminder to the reminded user account. The light interaction may be an interaction triggered by an operation on an avatar of a user. After receiving the trigger operation, the first client triggers a light interaction generation instruction, and generates a light interaction message according to the first field corresponding to the first user account, the second field corresponding to the second user account, and the action description field. For example, the light interaction message includes the first field, the action description field, and the second field arranged in sequence.

The action description field is a field used for indicating an action performed by the first user account on the second user account. This action is used for simulating user communication actions in a real environment, such as: patting, hugging, touching, kicking, poking, hitting, kissing, etc.

In some embodiments, the first field may be a name of the first user account. The action description field may be a field that is preset by a server, and the second field may be a name of the second user account. In some other embodiments, at least one of the first field, the second field, and the action description field is a custom field pre-edited by the user for the light interaction message.

In some embodiments, all or a part of characters in the first field corresponding to the first user account are pre-defined by the first user. All or a part of characters in the second field corresponding to the second user account are pre-defined by the second user.

In some embodiments, the action description field is pre-defined by the first user or the second user. When both the first user and the second user have defined action description fields, one of the two action description fields is selected according to a priority rule. For example, a priority of the sender of the light interaction message is higher than a priority of the recipient of the light interaction message.

The light interaction message is a different type of message than a chat message. For example, the light interaction message is implemented using a system message format, or a user-defined message format.

Step 306: Transmit (e.g., send) the interaction message to a second client logged in with the second user account.

The light interaction message may be transmitted to the second client logged in with the second user account through a server (for example, an instant messaging server) corresponding to the first client and the second client.

The light interaction message triggers the second client to display the light interaction message in a second chat window interface. For example, the light interaction message also triggers the second client to display an avatar animation of the avatar of the second user account in the second chat window interface. For example, the avatar animation is a shaking (e.g., moving) animation of the avatar.

To sum up, in the method provided by this embodiment, an interaction message is generated in response to an interaction instruction triggered on the avatar of the second user account, and at least one of the first field, the action description field, and the second field in the interaction message is a custom field pre-edited by the user. Since two users cannot predict what the other's custom field is, it provides a new type of interaction method with a light reminder function, which is suitable for chat scenarios in a fun, a relaxed, and pleasant atmosphere.

Figure 4:
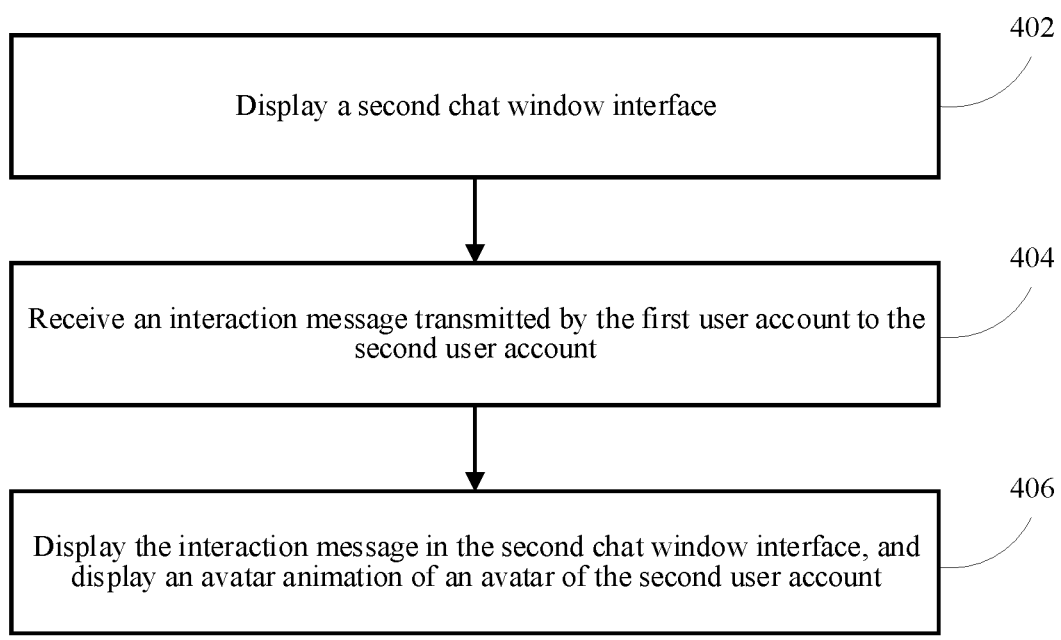
FIG. 4 is a method flowchart of a message receiving method according to an exemplary embodiment of this application.

FIG. 4 is a flowchart of a message receiving method according to another exemplary embodiment of this application. This embodiment is described using an example where the method is executed by the second client shown in FIG. 1. The second client logs in with a second user account. The method includes:

Step 402. Display a second chat window interface.

The second chat window interface is a chat window interface for chatting between the second user account and at least the first user account. The second chat window interface is a chat window interface of a two-person chat or a chat window interface of a multi-person group chat. For example, the chat window interface of the two-person chat is a chat interface of the first user account and the second user account, and the chat window interface of the multi-person group chat is a group chat interface between the first user account, the second user account, and other user account(s). For example, the second chat window interface displays a chat message list sorted in chronological order.

In each chat message in the chat message list, an avatar of a user account as the sender and a message content of the chat message may be displayed. For example, each chat message further displays a remark name, a group nickname, or a custom nickname of the user account. The remark name is a name remarked to the current user account by other user accounts, the group nickname is a nickname defined by the current user account for itself in a group, and the custom nickname is a nickname defined by the current user account for itself in a client. The remark name may also be a name remarked to another user account by the current user account.

Taking the second chat window interface being a chat window interface of a multi-person group chat as an example, the multi-person group includes at least two user accounts, and the at least two user accounts include the first user account, the second user account, and other user account(s).

Step 404: Receive an interaction message transmitted by the first user account to the second user account.

The second client receives the interaction message between the first user account and the second user account transmitted by the server. The interaction message is a light interaction message. The light interaction message is generated by the first user triggering a first client, where the first client is a client logged in with the first user account.

For example, the light interaction message includes the first field, the action description field, and the second field arranged in order.

The action description field is a field used for indicating an action performed by the first user account on the second user account. This action is used for simulating a user communication action in a real environment, such as: patting, hugging, touching, kicking, poking, hitting, kissing, etc.

In some embodiments, the first field may be a name of the first user account, the action description field may be a field preset by a server, and the second field may be a name of the second user account. In some other embodiments, at least one of the first field, the second field, and the action description field is a custom field pre-edited by the user for the light interaction message.

In some embodiments, all or a part of characters in the first field corresponding to the first user account are pre-defined by the first user. All or a part of characters in the second field corresponding to the second user account are pre-defined by the second user.

In some embodiments, the action description field is pre-defined by the first user or the second user. When both the first user and the second user have defined action description fields, one of the two action description fields is selected according to a priority rule. For example, a priority of the sender of the light interaction message is higher than a priority of the recipient of the light interaction message.

The light interaction message is a different type of message than a chat message. For example, the light interaction message is implemented using a system message format, or a user-defined message format.

Step 406: Display the interaction message in the second chat window interface, and display an avatar animation of an avatar of the second user account.

For example, the light interaction message not only triggers the second client to display the avatar animation of the avatar of the second user account in the second chat window interface, but also triggers the second client to display the light interaction message in the second chat window interface.

To sum up, in the method provided by this embodiment, at least one of the first field, the action description field, and the second field in the light interaction message is a custom field pre-edited by the user. Since two users cannot predict the custom field of each other, a new interaction method with a light reminder function is provided, which is suitable for achieving an interesting interaction in a relaxed and pleasant atmosphere in a chat scenario.

Figures 5A, 5B:
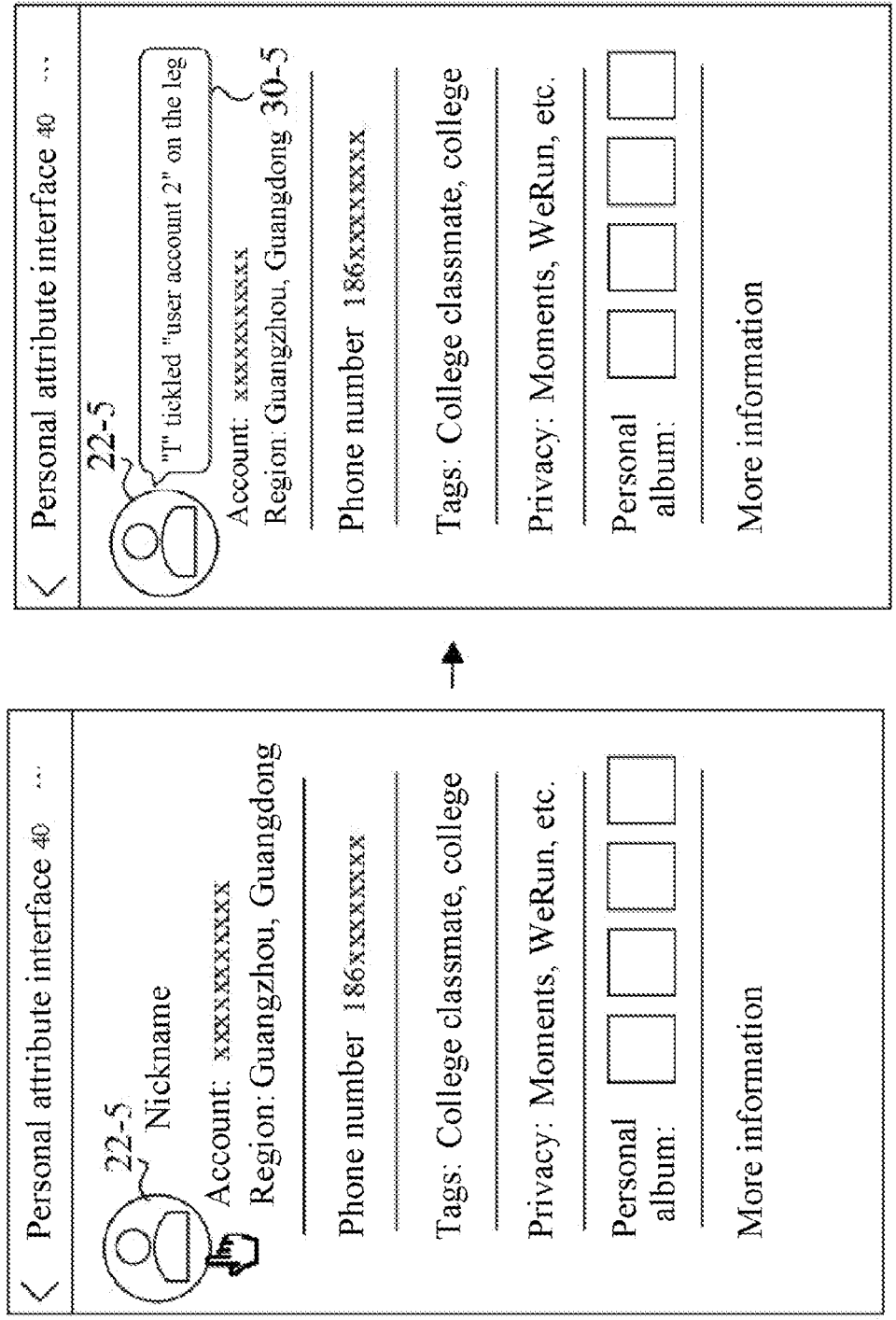
FIG. 5A and FIG. 5B are schematic interface diagrams of a personal attribute interface according to an exemplary embodiment of this application.

In an embodiment shown in FIG. 5A and FIG. 5B, a personal attribute interface 40 is a user interface for displaying personal attribute information of the second user account. The personal attribute information of the second user account includes at least one of: the second user account, the name of the second user account (e.g., nickname, group member name, remark name, etc.), the avatar of the second user account, a region where the second user account is located, a phone number of the second user account, a tag of the second user account, a friend permission of the second user account, a personal album of the second user account, and information displayed by the second user account in Moments. When the first user double-taps an avatar 22-5 of the second user account in the personal attribute interface 40 (as shown in FIG. 5A), a light interaction message 30-5 is displayed on a peripheral side of the avatar 22-5 of the second user account: "I" tickled "user account 2" on the leg (as shown in FIG. 5B). At the same time, the second client of "user account 2" receives the light interaction message. The light interaction message may be transmitted by the first client to the second client.

Figures 6A, 6B:
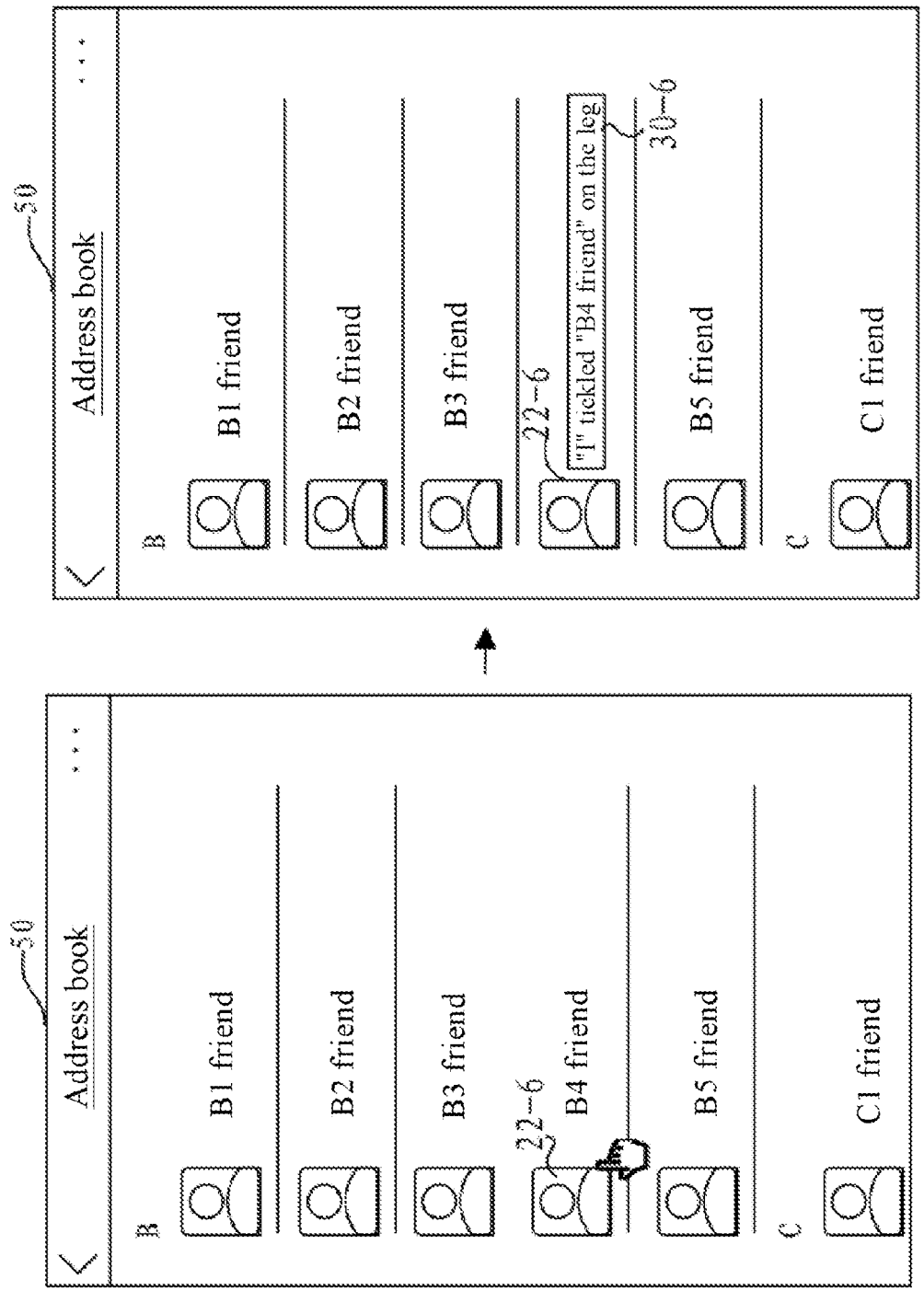
FIG. 6A and FIG. 6B are schematic interface diagrams of an address book interface according to an exemplary embodiment of this application.

In an embodiment shown in FIG. 6A and FIG. 6B, an address book interface 50 is a user interface for displaying all friend user accounts of the first user account. The friend user accounts of the first user account include the second user account. For example, the address book interface 50 further includes at least one of a chat group, a subscribed account, and an official account saved by the first user account. The address book interface 50 includes a plurality of friend user accounts sorted according to initials of Chinese pinyin or English words. When the first user double-taps an avatar 22-6 of the second user account in the address book interface 50 (as shown in FIG. 6A), a light interaction message 30-6 is displayed on a peripheral side of the avatar 22-6 of the second user account: "I" tickled "B4 friend" on the leg (as shown in FIG. 6B). At the same time, the second client of "B4 friend" receives the light interaction message. The light interaction message may be transmitted by the first client to the second client.

Figures 7A, 7B:
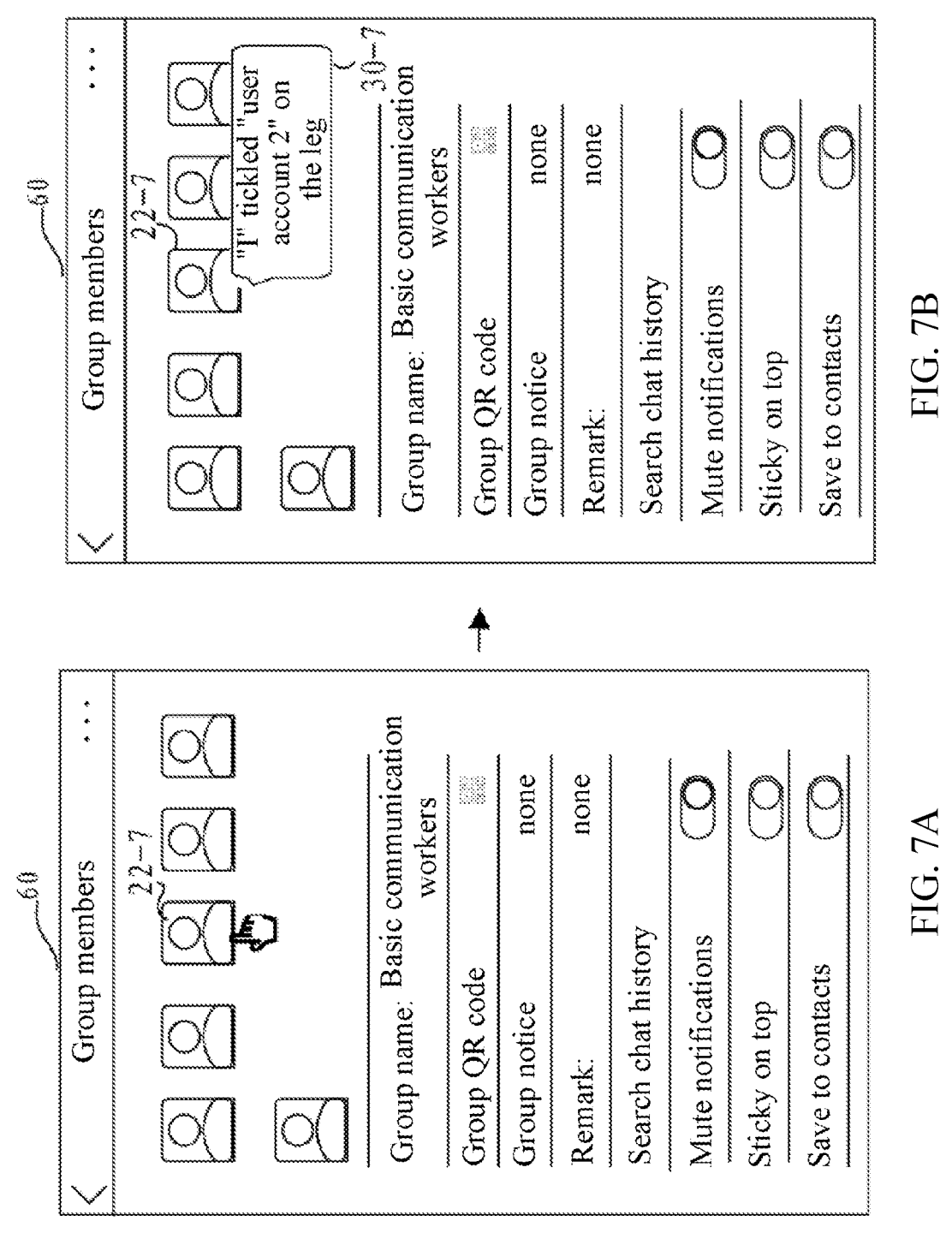

In an embodiment shown in FIG. 7A and FIG. 7B, a group member display interface 60 is a user interface for displaying group members of a group to which the first user account belongs. For example, the group member display interface 60 further displays: group name, group QR code, group notice, remark, entry to search searching chat history, mute notifications button, sticky on top button, an save to contacts button, and other information. When the first user double-taps an avatar 22-7 of the second user account on the group member display interface 60 (as shown in FIG. 7A), a light interaction message 30-7 is displayed on a peripheral side of the avatar 22-7 of the second user account: "I" tickled "User Account 2" on the leg (as shown in FIG. 7B). At the same time, the second client of "user account 2" receives the light interaction message. The light interaction message may be transmitted by the first client to the second client.

Figures 8A, 8B:
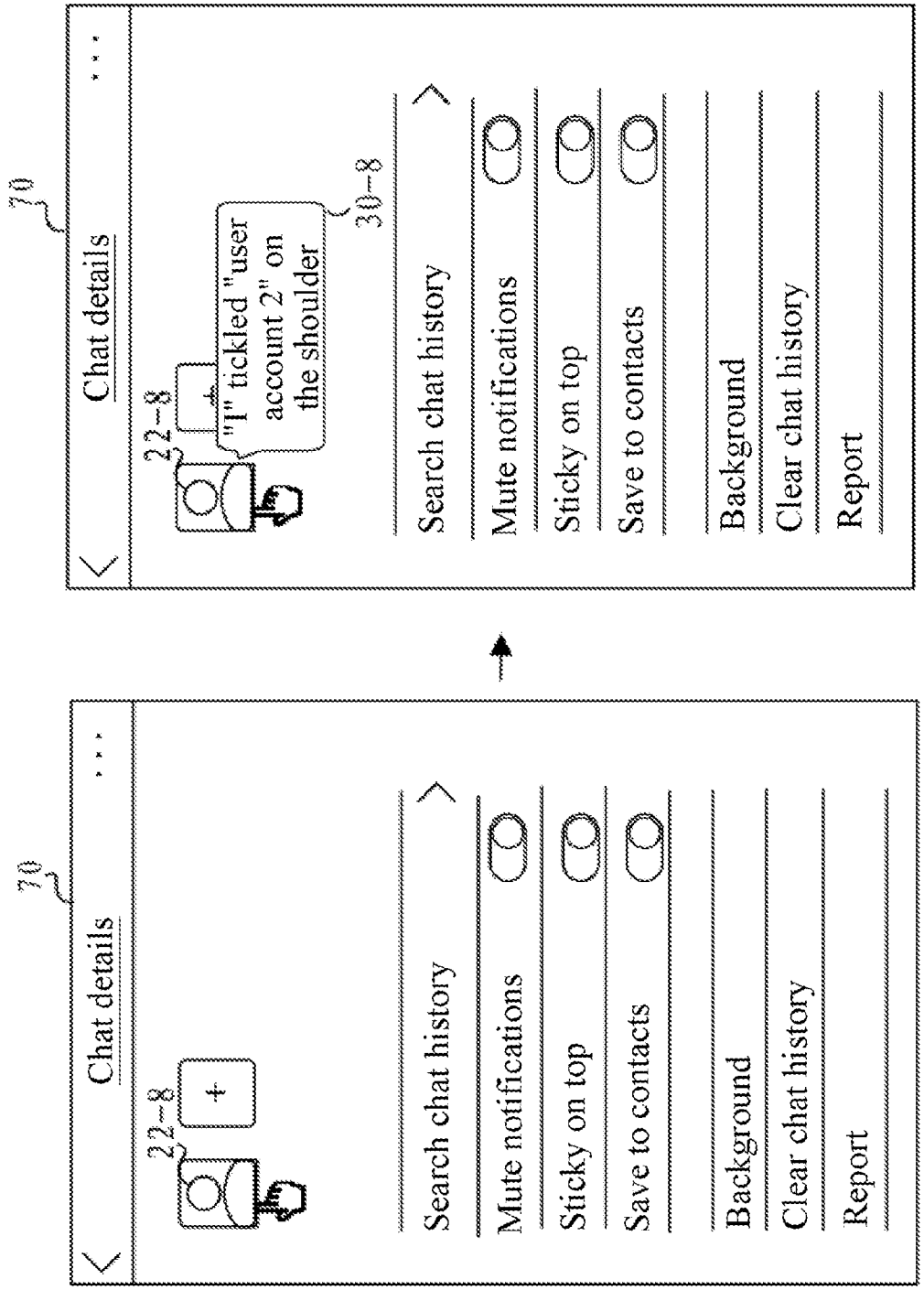
FIG. 8A and FIG. 8B are interface schematic diagrams of a single chat member display interface (single chat details page) according to an exemplary embodiment of this application.

In an embodiment shown in FIG. 8A and FIG. 8B, in a chat details interface 70 in which the first user account and the second user account conduct a two-person chat, the first user may also double-tap an avatar 22-8 of the second user account (as shown in FIG. 8A) to trigger a light interaction message 30-8 (as shown in FIG. 8B).

Figures 9A, 9B:
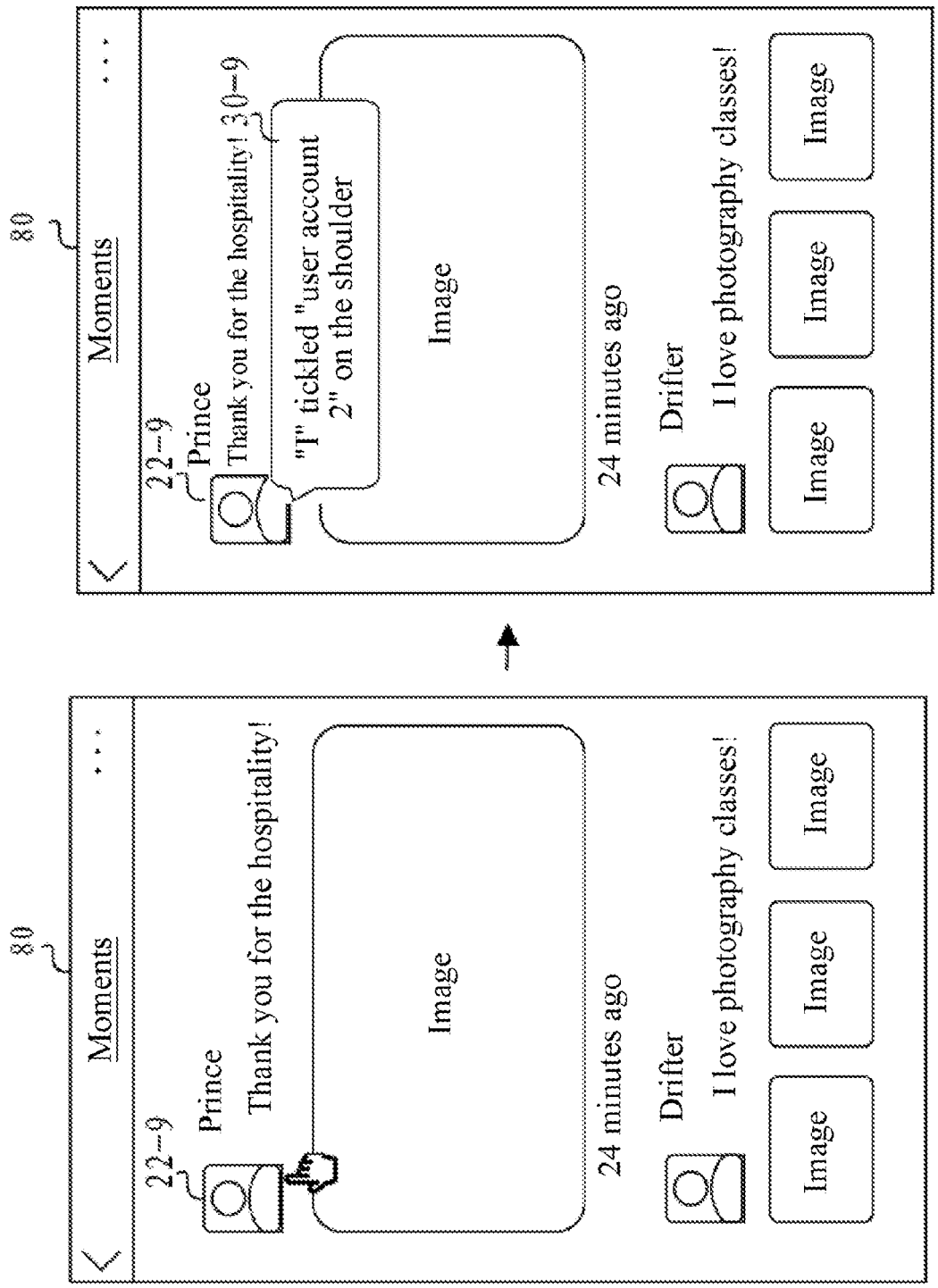
FIG. 9A and FIG. 9B are schematic interface diagrams of a social circle display interface according to an exemplary embodiment of this application.

In an embodiment shown in FIG. 9, a social circle interaction interface 80 is a user interface for displaying dynamic information of the first user account and friend user accounts of the first user account. The dynamic information is display information assembled from at least one type of information selected from text, picture, audio, video, location, and time. When the first user taps on (e.g., a single tap, a double-tap, etc.) an avatar 22-9 of the second user account (as shown in FIG. 9A), a light interaction message 30-9 is displayed on a peripheral side of the avatar 22-9 of the second user account: "I" tickled "Prince" on the shoulder (as shown in FIG. 9B). At the same time, the second client of "Prince" receives the light interaction message. The light interaction message may be transmitted by the first client to the second client.

Figure 10:
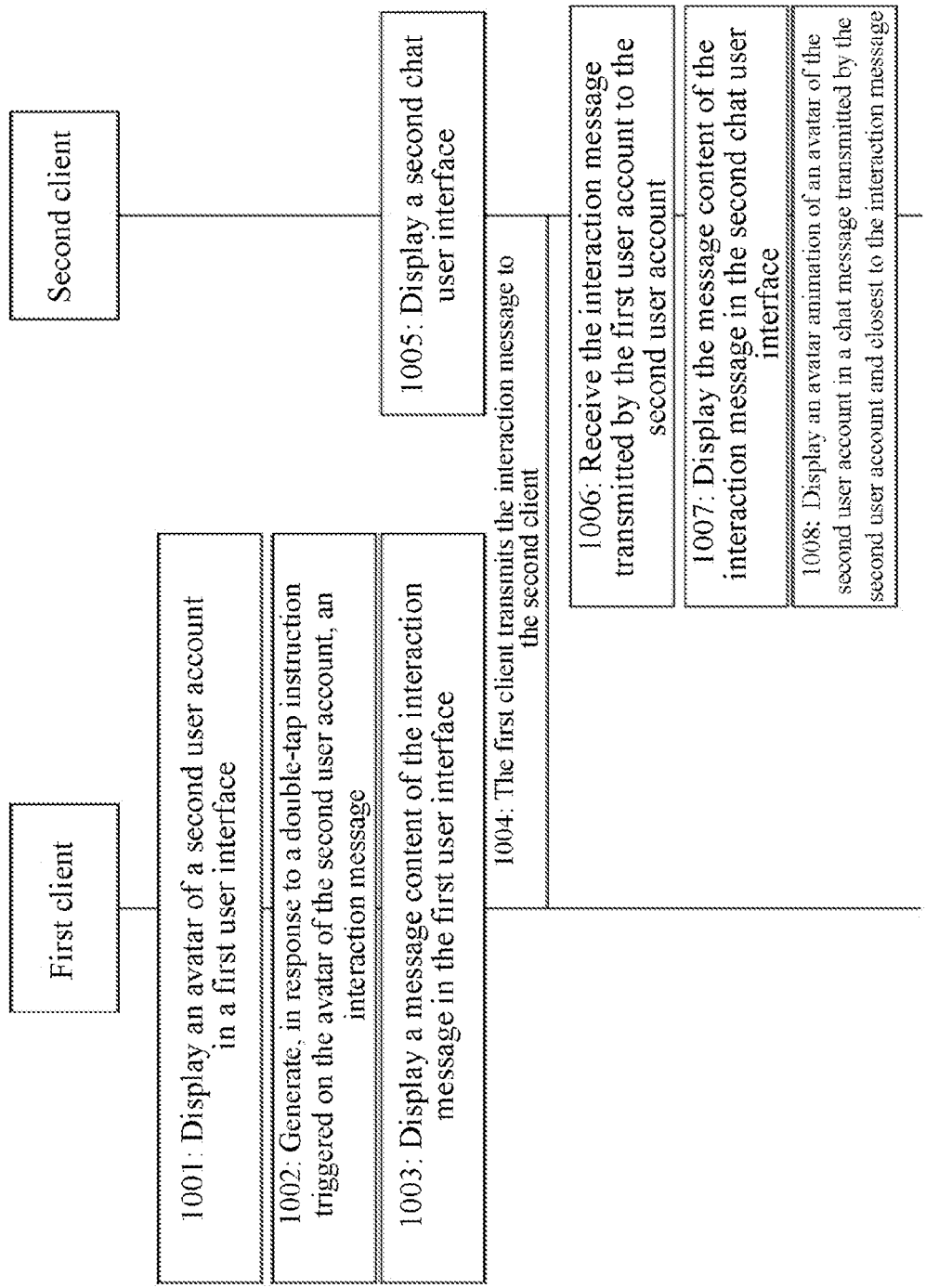
FIG. 10 is a flowchart of a message transmission/receiving method according to an exemplary embodiment of this application.

FIG. 10 is a flowchart of a message transmission/receiving method according to another exemplary embodiment of this application. This embodiment is described using an example where the method is executed by the first client and the second client shown in FIG. 1. The method includes the following steps:

Step 1001. The first client displays an avatar of a second user account in a first user interface.

The first user interface is any user interface that displays the avatar of the second user account in the first client. The first user interface may be a non-chat window interface or a first chat window interface.

The first chat window interface is a user interface for chatting between the first user account and other user accounts. The first chat window interface includes a chat window interface of a two-person chat or multi-person group chat. The first chat window interface displays a chat message list sorted in chronological order.

In some embodiments, the first user account and the second user account are different user accounts. In some other embodiments, the first user account and the second user account are the same user account.

Step 1002. The first client generates an interaction message in response to a double-tap instruction triggered on an avatar of the second user account.

The first user performs a trigger operation on the avatar of the second user account. The trigger operation may include at least one of a double-tap operation, a single-tap operation, or a press-and-hold operation. In this embodiment, the double-tap instruction is, for example, a light interaction instruction.

After receiving the trigger operation, the first client triggers a light interaction generation instruction, and generates a light interaction message according to the first field corresponding to the first user account, the second field corresponding to the second user account, and the action description field. For example, the light interaction message includes the first field, the action description field, and the second field arranged in order.

The action description field is a field used for indicating an action performed by the first user account on the second user account. This action is used for simulating a user communication action in a real environment, such as: patting, hugging, touching, kicking, poking, hitting, kissing, etc.

At least one of the first field, the second field, and the action description field is a custom field pre-edited by the user for the light interaction message.

In some embodiments, all or a part of characters in the first field corresponding to the first user account are pre-defined by the first user. All or a part of characters in the second field corresponding to the second user account are pre-defined by the second user.

In some embodiments, the action description field is pre-defined by the first user or the second user. When both the first user and the second user have defined action description fields, one of the two action description fields is selected according to a priority rule. For example, a priority of the sender of the light interaction message is higher than a priority of the recipient of the light interaction message.

For example, the light interaction message is implemented using a system message format. For example, the system message carries the first user account and the second user account, or the system message carries the first user account, the second user account, and a light interaction identifier, or the system message carries the first field, the second field, and the action description field.

In some embodiments, the first client terminal further displays an avatar animation of the avatar of the second user account in the first user interface, where the avatar animation is an animation displayed based on the avatar of the second user account. Being based on the avatar of the second user account is, for example, based on an avatar position or an avatar area of the second user account. For example, the avatar animation includes but is not limited to at least one of the following: an animation in which the avatar of the second user account shakes, an animation in which the avatar of the second user account rotates, an animation in which the avatar of the second user account is superimposed with a filter, an animation in which the avatar of the second user account is superimposed with another display element (e.g., human hand), or an animation in which the avatar of the second user account is reduced or enlarged.

The avatar animation may be displayed all the time or in some cases. For example, in some embodiments, in response to a determination (e.g., by the terminal and/or the client) that the first user interface is a non-chat window interface, the first client does not display the avatar animation of the avatar of the second user account. In some embodiments, in response to a determination that the first user interface is the first chat window interface, the first client displays the avatar animation of the avatar of the second user account.

In this embodiment, the avatar animation is, for example, an animation in which the avatar of the second user account shakes.

Step 1003. The first client displays a message content of the interaction message in the first user interface.

In some embodiments, the first client displays the light interaction message in a target area which is based on the avatar of the second user account in the first user interface. The target area is an area on a peripheral side of the avatar of the second user account, e.g., a right side of or below the avatar of the second user account. In some embodiments, in response to a determination that the first user interface being a non-chat window interface, the first client displays the light interaction message in the target area which is based on the avatar of the second user account in the non-chat window interface, as shown by light interaction messages 30-5, 30-6, 30-7, and 30-8 in FIG. 5B to FIG. 8B. In some embodiments, in response to a display duration of the light interaction message reaching a threshold duration, the displaying of the light interaction message in the non-chat window interface is canceled by the client. For example, the threshold duration may be 3 seconds, 5 seconds, 10 seconds, etc.

Figure 11:
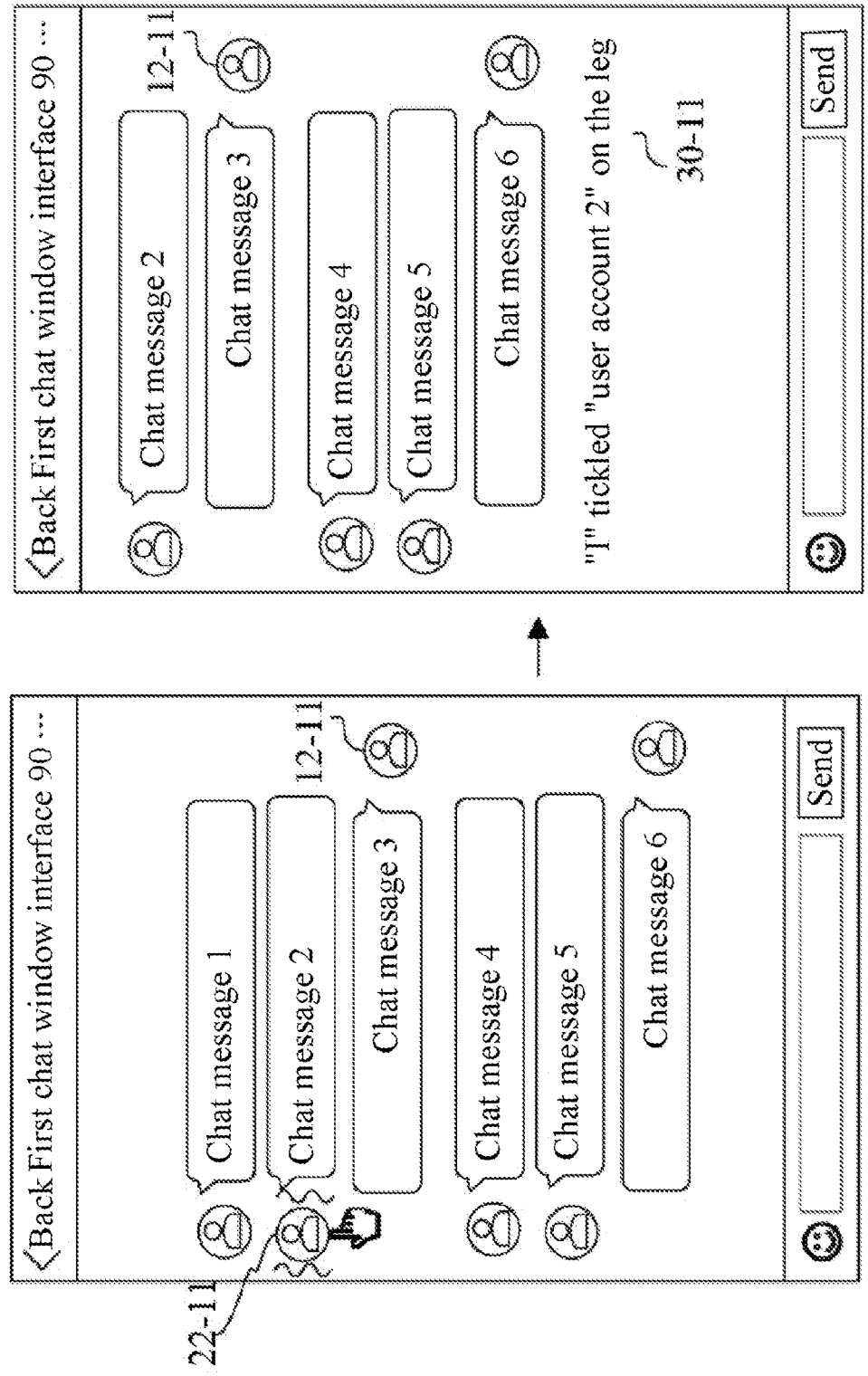
FIG. 11A and FIG. 11B are schematic interface diagrams of a message transmission/receiving method according to another exemplary embodiment of this application.

In some embodiments, in response to a determination that the first user interface is the first chat window interface, the first client displays the light interaction message in the first chat window interface, as shown by 30-11 in FIG. 11B. When the light interaction message is displayed in the first chat window interface, a message display manner of the light interaction message is different from a message display manner of a chat message.

For example, the message display manner of the light interaction message is: displaying the message content in a text form without a bubble background. The message display manner of the chat message is: displaying the message content in a form with a bubble background. That is to say, the light interaction message is not displayed in a bubble form, but is displayed using the message display manner of the system message.

For example, when the first client displays the light interaction message, the message content of the light interaction message is assembled by the first client itself. For example, the message content of the light interaction message includes: the first field, the action description field, and the second field arranged in order. This is because if the light interaction message is generated by the server side and forwarded to the first client, a certain delay is required. When the light interaction message is assembled and displayed by the first client itself, the delay can be ignored.

Considering that the avatar of the second user account may be located at any position in the chat message list, the avatar of the second user account on which the first user taps may be located in the middle of the chat message list. In this case, the method further includes the following step:

in response to a determination that a content displayed in the first chat window interface does not include a latest message content, the client causes automatically scrolling of message content in the first chat window interface to the latest message content, the latest message content including the message content of the light interaction message. For example, in response to a determination that a content displayed in the first chat window interface does not include a latest message content in a chat message list, the chat message list may be automatically scrolled to the latest message content in the first chat window interface, to display the latest message content in the first chat window interface, the latest message content including the message content of the interaction message. As shown in FIG. 11A, after the first user double-taps an avatar of the second user account corresponding to a chat message 2 on a first chat window interface 90, the first client displays the avatar of the second user account as a shaking animation 22-11. However, because the chat message 2 is ranked in front in the chat message list, when the chat message 2 is displayed in the first chat window interface 90, message contents at the bottom of the chat message list cannot be displayed. In this case, the first chat window interface 90 automatically scrolls to the latest message content in the first chat window interface, and the latest message content includes a light interaction message: "I" tickled "user account 2" on the leg, so that the first user can learn in time that the light interaction message has been successfully triggered, preventing the user from repeatedly double-taping the avatar 22 of the second user account to cause a waste of computing resources and network resources when the user does not see any feedback. As shown in FIG. 11B, after displaying the avatar of the second user account as the shaking animation 22-11, the first client may automatically scroll the chat message list to the position of the latest message content in the first chat window interface, to display the content of the latest message in the first chat window interface 90. The content of the latest message includes a light interaction message 30-11: "I" tickled "User Account 2" on the leg.

For example, because the chat messages are arranged in chronological order, the latest message content is displayed in a bottom display area of the first chat window interface.

Step 1004. The first client sends the interaction message to the second client.

The first client sends the light interaction message to the second client through a server. For example, the first client sends the light interaction message to the server based on a format of a system message (or a newly defined message format), and when the server verifies that the light interaction message meets a transmission condition, the server transmits the light interaction message to the second user account.

In some embodiments, in response to a determination (e.g., by the server and/or the client) that the first user interface is a personal attribute interface, an address book interface, a single chat member display interface (also referred to as a single chat details page), a social circle interaction interface, or the first chat window interface, the server transmits the light interaction message to the first user account and the second user account (or to only the second user account), e.g., the server transmits the light interaction message to a single chat window interface of the first user account and the second user account; and in response to a determination that the first user interface being a first chat window interface or a group member display interface (also referred to as a group chat details page) for a group chat with more than three people, the server transmits the light interaction message to each user account (or all the user accounts except the first user account) in the chat group, i.e., the server transmits the light interaction message to the group chat window interface of the first user account and the second user account.

For example, the transmission condition includes a condition for limiting a transmission frequency. The transmission condition includes but is not limited to at least one of the following conditions:

Condition 1: The number of times the first user account transmits the light interaction message to the second user account within a time period A does not exceed x. For example, the number of times the light interaction message is transmitted to the same user account within 2 seconds is not greater than 1.

Condition 2: The number of times all user accounts in the same group transmit light interaction messages within a time period B is not greater than y. For example, the number of times all user accounts in the same group transmit light interaction messages within 10 seconds is not greater than 30.

If the light interaction message transmitted by the first client does not meet the transmission condition, the server transmits a failure prompt to the first client. For example, the failure prompt can include a message such as "not allowed to send tickle messages too often".

Step 1005. The second client displays a second chat window interface.

The second chat window interface displays avatars of at least two user accounts, and the at least two user accounts include the first user account and the second user account. The first user account and the second user account are not necessarily displayed in the second chat window interface at the same time, but may appear in any possible position in the chat message list.

For example, the second chat window interface is a chat window interface of a two-person chat or a chat window interface of a multi-person group chat. The second chat window interface displays a chat message list sorted in chronological order.

The first chat window interface and the second chat window interface are of the same chat session (a two-person chat session or a multi-person group chat session), and are displayed on two clients logged in with different user accounts respectively.

Step 1006. The second client receives an interaction message transmitted by the first user account to the second user account.

The second client receives the light interaction message forwarded by the server. The light interaction message is encapsulated using a message format of a system message. For example, the light interaction message includes: the first user account, the second user account, and a light interaction identifier, or the system message carries the first field, the second field, and the action description field. The light interaction identifier is an identifier used for indicating that the message type is a light interaction message.

For example, a message content of the light interaction message is assembled by the second client itself. For example, the message content of the light interaction message includes: the first field, the action description field, and the second field arranged in order. When the light interaction message includes the first user account and the second user account, the first field is determined by querying a local database according to the first user account, the second field is determined by querying the local database according to the second user account, and the action description field is determined according to at least one of a server setting, a first user account setting, or a second user account setting. The local database stores custom fields pre-edited by the server and the user accounts (the current user and friends of the current user).

Because the forwarding of the light interaction message through the server side requires a certain delay, the delay can be minimized when the light interaction message is assembled and displayed by the second client itself.

Step 1007. The second client displays a message content of the interaction message in the second chat window interface, a message display manner of the interaction message being different from a message display manner of a chat message.

The second chat window interface includes a chat message list sorted in chronological order. The second client additionally displays the message content of the light interaction message at the bottom of the chat message list in the second chat window interface.

For example, the message display manner of the light interaction message comprises displaying the message content in a text form without a bubble (e.g., a text bubble, a messaging bubble, etc.) background. The message display manner of the chat message is: displaying the message content in a text form with a bubble background (e.g., the message content is displayed in a text bubble). That is to say, the light interaction message is not displayed in a bubble form, but is displayed using the message display manner of the system message.

In some embodiments, the light interaction message is displayed in the second chat window interface using a first message display manner, in response to a determination that the light interaction message being an unread message; and the light interaction message is displayed in the second chat window interface using a second message display manner, in response to a determination that the light interaction message being a read message, the first message display manner is different from the second message display manner. For example, in the first message display manner, the action description field is blue, and the first field and the second field are gray; in the first message display manner, the action description field, the first field, and the second field are all gray.

In some embodiments, chat members of the second chat window interface further include a third user account. The second terminal further receives another light interaction message (e.g., a second light interaction message) transmitted by the chat member to the third user account, and displays the other light interaction message in the second chat window interface, in a message display manner that is different from the message display manner of the previous light interaction message. For example, a message content of the second light interaction message is displayed in non-bold fonts, while the light interaction message transmitted to the second user account is displayed in bold fonts.

Step 1008. The second client displays an avatar animation of the avatar of the second user account in an avatar area corresponding to a chat message transmitted by the second user account and closest to the interaction message.

The avatar animation is an animation displayed based on the avatar of the second user account. For example, the avatar animation includes but is not limited to at least one of the following: an animation in which the avatar of the second user account shakes, an animation in which the avatar of the second user account rotates, an animation in which the avatar of the second user account is superimposed with a filter, an animation in which the avatar of the second user account is superimposed with another display element (e.g., human hand), or an animation in which the avatar of the second user account is reduced or enlarged.

For example, the avatar animation of the avatar of the second user account is an animation associated with an action description in the message content of the light interaction message, such as tickling the avatar of the second user account, or touching the avatar of the second user account.

Because the message content of the light interaction message may be at a distance from the chat messages transmitted by the second user account, or, in other words, at a distance from the avatars of the second user account, the second client first determines a chat message closest to the light interaction message among the chat messages transmitted by the second user account, and then displays the avatar of the second user account corresponding to the closest chat message as an avatar animation.

Figures 12, 13:
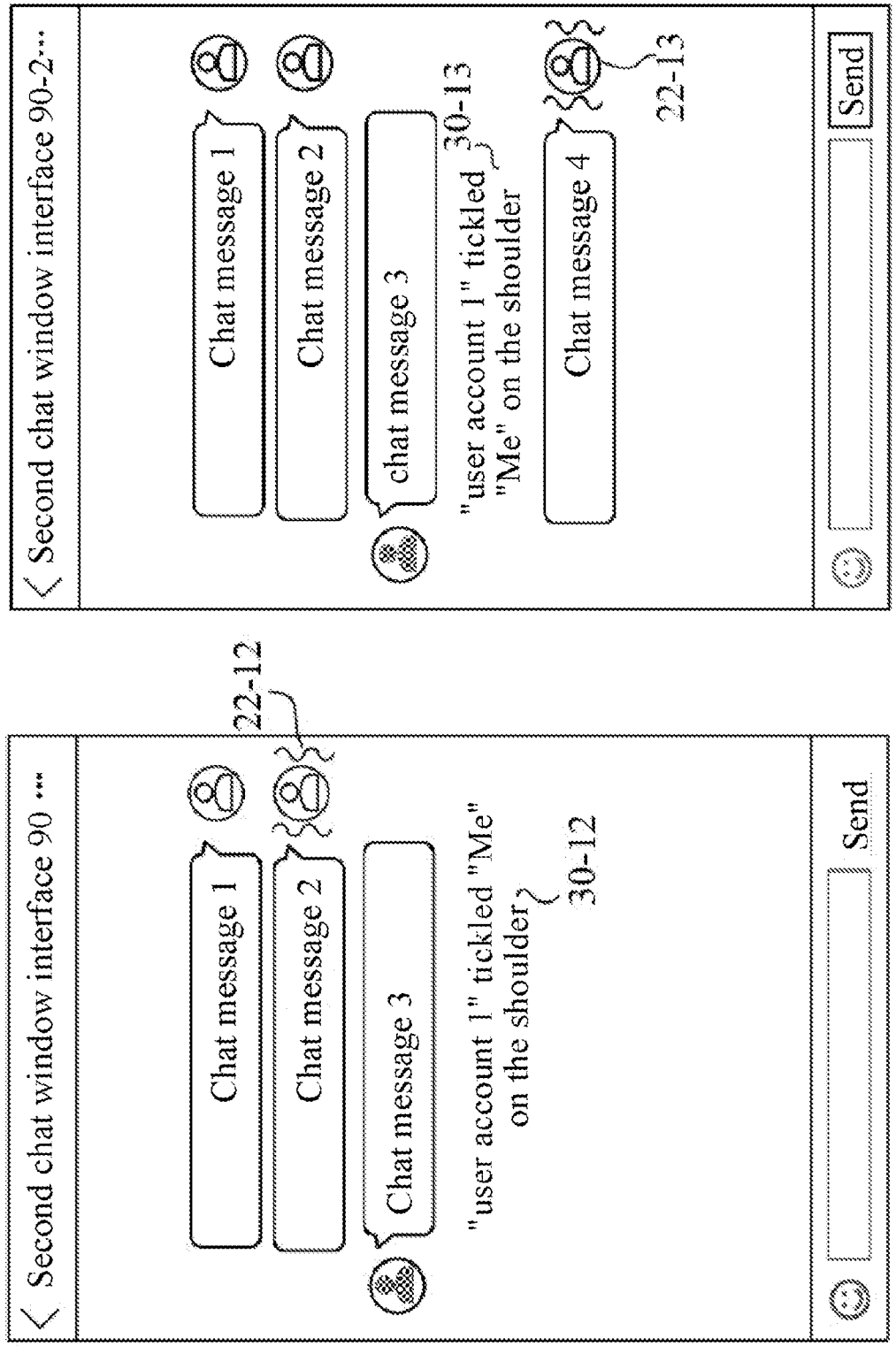
FIG. 12 is a schematic interface diagram of a message transmission/receiving method according to an exemplary embodiment of this application.
FIG. 13 is a schematic interface diagram of a message transmission/receiving method according to an exemplary embodiment of this application.

As shown in FIG. 12, in chat messages 1 and 2 transmitted by the second user account, it is determined that the chat message closest to a light interaction message 30-12 is the chat message 2, and the second client displays the avatar of the second user account in the chat message 2 before the light interaction message 30-12 as a shaking animation 22-12.

As shown in FIG. 13, in chat messages 1, 2, and 4 transmitted by the second user account, it is determined that the chat message closest to a light interaction message 30-13 is the chat message 4, and the second client displays the avatar of the second user account in the chat message 4 after the light interaction message 30-13 as a shaking animation 22-13. For example, assuming that the chat message 2 and the chat message 4 is at the same distance from the light interaction message 30-13, the chat message 2 in front is preferentially selected. A distance between two messages is measured by the number of messages between them.

Step 1007 may be executed before step 1008, step 1007 may be executed after step 1008, or step 1007 and step 1008 may be performed simultaneously.

For a multi-person group chat, another user account than the first user account and the second user account also receives the light interaction message, and another client logged in with the another user account encapsulates and displays the message content of the light interaction message. The another client may display a shaking animation of the avatar of the second user account, or may not display a shaking animation of the avatar of the second user account.

The second user account may be the first user account, i.e., the user may choose to transmit a light interaction message to himself/herself, to trigger displaying of the light interaction message: "I" tickled myself.

To sum up, in the method provided by this embodiment, a light interaction message is transmitted in response to a light interaction instruction triggered on the avatar of the second user account, and the light interaction message is used for triggering the second client to display the light interaction message and an avatar animation of the avatar of the second user account in the second chat window interface. As such, a new interaction method with a light reminder function is provided, which is suitable for achieving an interesting interaction in a relaxed and pleasant atmosphere in a chat scenario.

Because the light interaction message is a message that simulates user behavior, rather than a message containing a user-defined message content, users can use light interaction messages to express their light-weight interaction intends in some chat scenarios where they do not want to speak, do not know what to say, or want to express obscure meanings.

In an embodiment based on the above embodiments, at least one of the first field, the action description field, and the second field is a custom field pre-edited by the user.

In some embodiments, the first field is a custom field, and the first field includes: a name of the first user account, and at least one of a custom prefix or a custom suffix of the first user account.

When the light interaction message is displayed in the first user interface, the name of the first user account is replaced by the first person "I" or the second person "You". When the light interaction message is displayed in the second chat window interface, the name of the first user account includes at least one of a remark name, a group nickname, and a custom nickname. For example, a priority of the remark name is higher than a priority of the group nickname, and the priority of the group nickname is higher than a priority of the custom nickname. When there is a remark name, the remark name is preferentially displayed. When there is no remark name but there is a group nickname, the group nickname in this group is preferentially displayed. When there is neither a remark name nor a group nickname, the custom nickname is displayed.

The custom prefix of the first user account is text before the name of the first user account, and the custom suffix of the first user account is text after the name of the first user account. Both or only one of the custom prefix and the custom suffix may be set. When both the custom prefix and the custom suffix are set, both or only one of the custom prefix and the custom suffix may appear. For example, when the first user account is the sender of the light interaction message, the custom prefix appears; when the first user account is the recipient of the light interaction message, the custom suffix appears.

Figure 14:
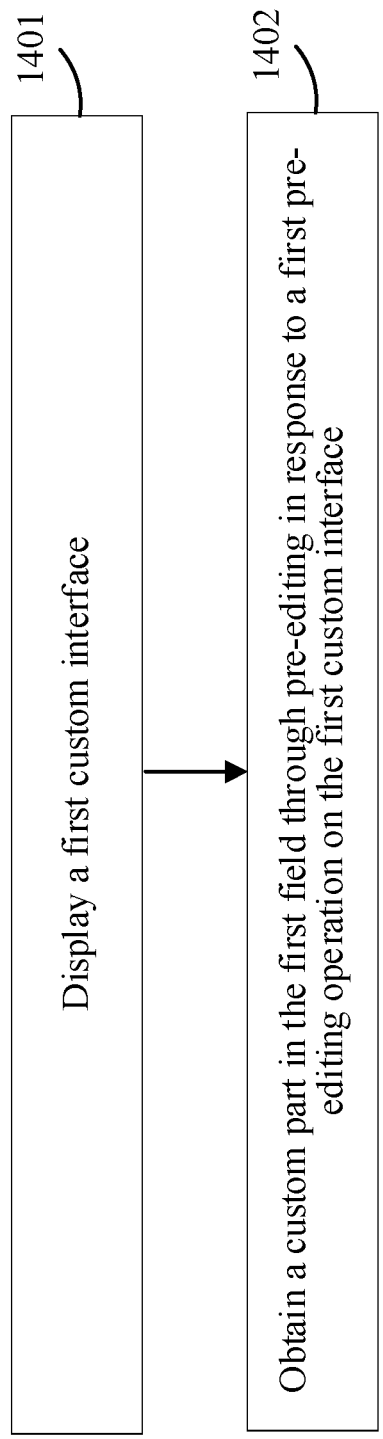
FIG. 14 is a flowchart of a method for customizing a first field according to an exemplary embodiment of this application.

Based on the above embodiments, FIG. 14 is a flowchart of a method for customizing a first field according to an exemplary embodiment of this application. The method may be executed by a first client. The method includes:

Step 1401. Display a first custom interface.

Figure 15:
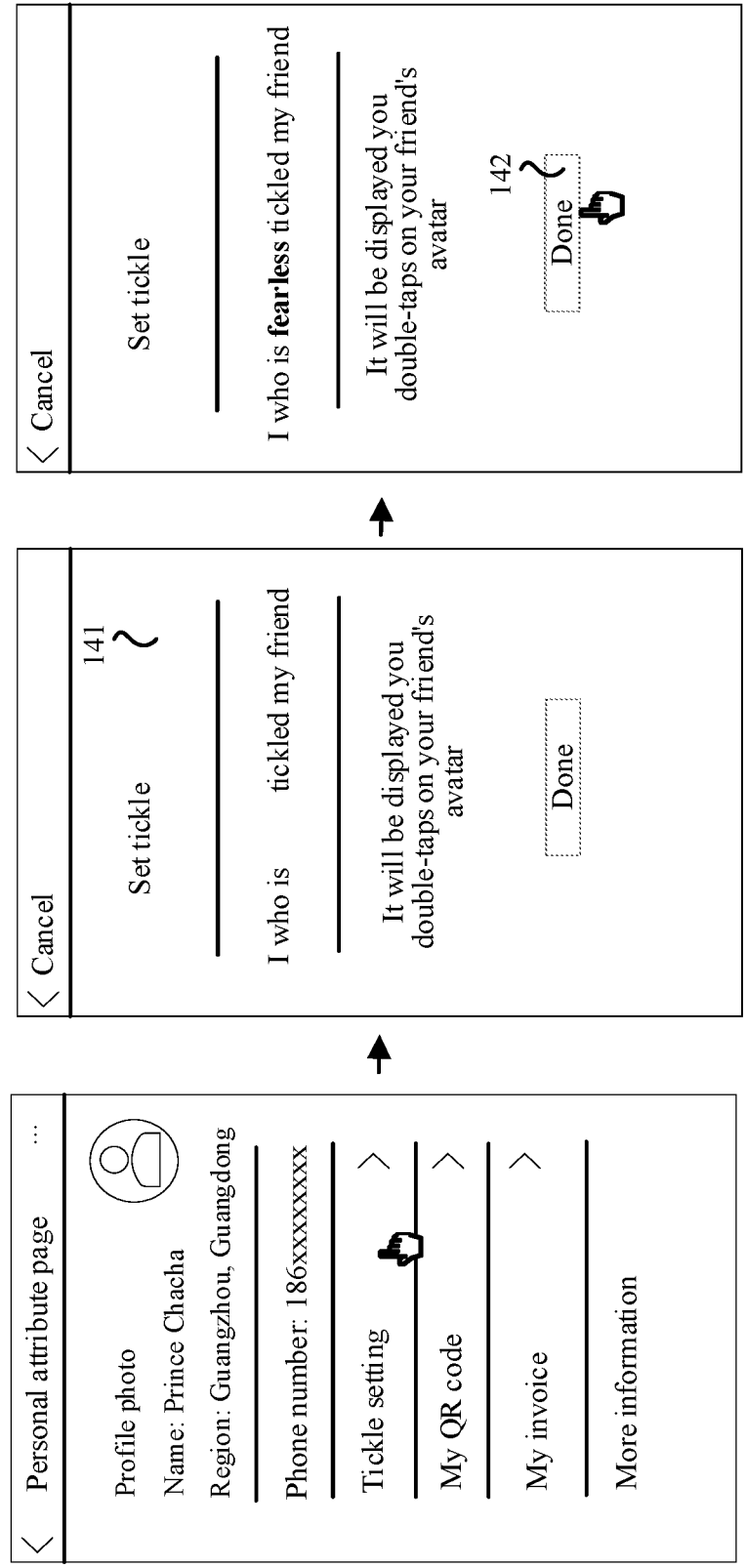
FIG. 15A, FIG. 15B, and FIG. 15C are schematic interface diagrams of a method for customizing a first field according to an exemplary embodiment of this application.

The first custom interface is a user interface for customizing the first field. For example, referring to FIG. 15A, the first user taps "Tickle setting" in a personal attribute page of the first user account on the first client, and the first client displays a first custom interface 141, as shown in FIG. 15B. In this embodiment, setting of the custom prefix of the first user account is taken as an example for illustration.

Step 1402. Obtain a custom part in the first field through pre-editing in response to a first pre-editing operation on the first custom interface.

The first pre-editing operation is an editing operation before the light interaction message is transmitted. The first client edits and saves the custom part of the first field according to an editing operation of the D15 user on the first custom interface 141. In this embodiment, the custom part of the first field is the custom prefix of the first user account. As shown in FIG. 15C, the custom part of the first field is, for example, "fearless".

For example, the number of characters in the custom part of the first field is limited, for example, is 8 at most.

As shown in FIG. 15C, after the first user taps a Done button 142, the first client saves the custom part of the first field, and synchronizes the custom part of the first field to the server and a second client corresponding to a second user account who has a friend relationship with the first user account.

To sum up, in the method provided in this embodiment, by providing the custom function of the first field, the second user cannot predict the first field customized by the first user, which improves the interest of the light interaction message and improves the frequency of interaction between the first user account and the second user account.

In some embodiments, the second field is the custom field and includes: a name of the second user account, and at least one of a custom prefix or a custom suffix of the second user account.

When the light interaction message is displayed in the second user interface, the name of the second user account is replaced by the first person "I" or the second person "You". When the light interaction message is displayed in the second chat window interface, the name of the second user account includes at least one of a remark name, a group nickname, and a custom nickname. For example, a priority of the remark name is higher than a priority of the group nickname, and the priority of the group nickname is higher than a priority of the custom nickname. When there is a remark name, the remark name is preferentially displayed. When there is no remark name but there is a group nickname, the group nickname in this group is preferentially displayed. When there is neither a remark name nor a group nickname, the custom nickname is displayed.

The custom prefix of the second user account is text before the name of the second user account, and the custom suffix of the second user account is text after the name of the second user account. Both or only one of the custom prefix and the custom suffix may be set. When both the custom prefix and the custom suffix are set, either one or both of the custom prefix and the custom suffix may appear. For example, when the second user account is the sender of the light interaction message, the custom prefix appears; when the second user account is the recipient of the light interaction message, the custom suffix appears.

Figure 16:
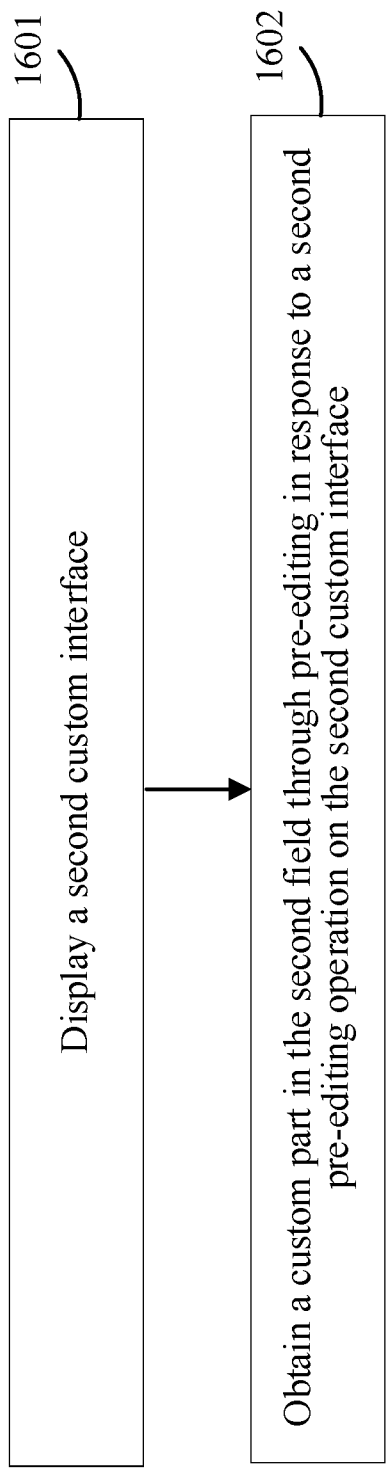
FIG. 16 is a flowchart of a method for customizing a second field according to an exemplary embodiment of this application.

Based on the above embodiments, FIG. 16 is a flowchart of a method for customizing a second field according to an exemplary embodiment of this application. The method may be executed by a second client. The method includes:

Step 1601. Display a second custom interface.

Figures 17A, 17B, 17C:
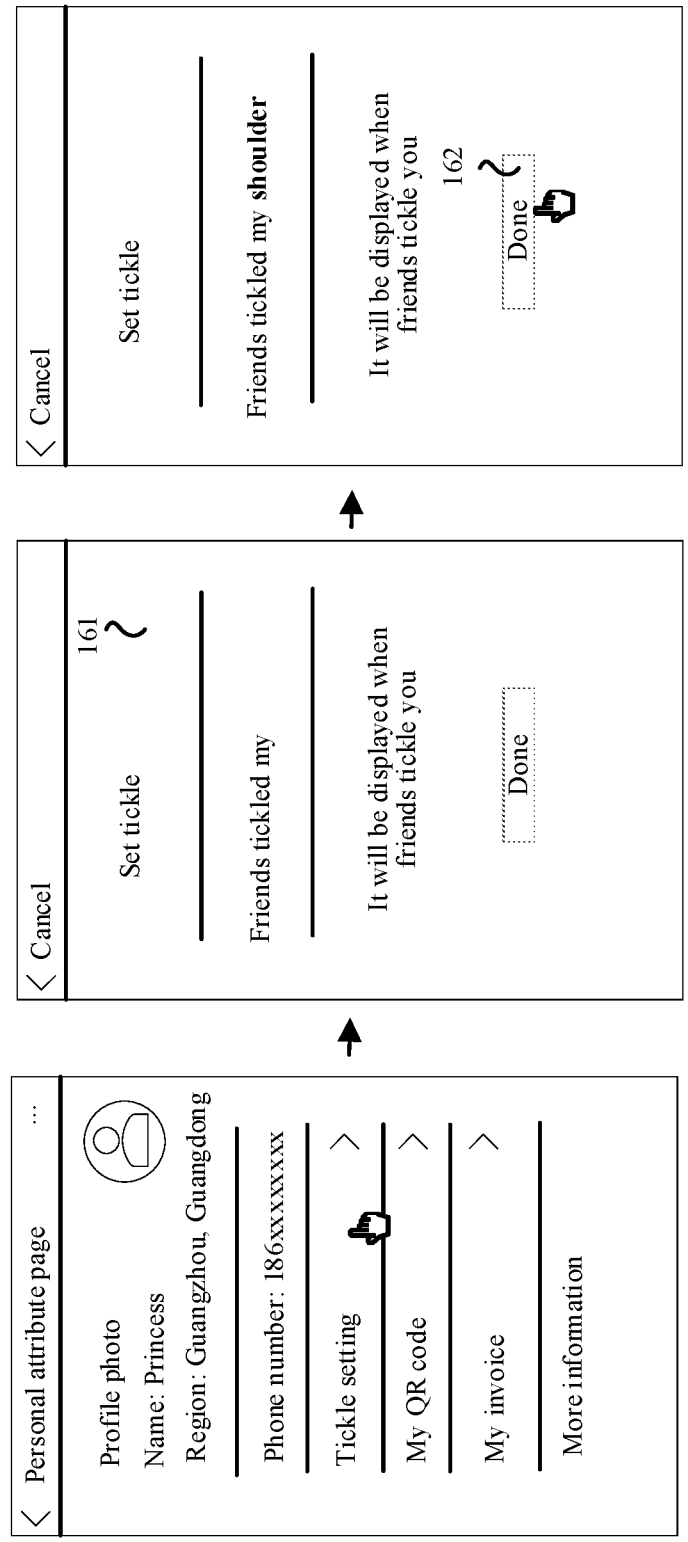
FIG. 17A, FIG. 17B, and FIG. 17C are schematic interface diagrams of a method for customizing a second field according to an exemplary embodiment of this application.

The second custom interface is a user interface for customizing the second field. For example, referring to FIG. 17A, the second user taps "Tickle setting" in a personal attribute page of the second user account, and the second client displays a second custom interface 161, as shown in FIG. 17B. In this embodiment, setting of the custom suffix of the second user account is taken as an example for illustration.

Step 1602. Obtain a custom part in the second field through pre-editing in response to a second pre-editing operation on the second custom interface.

The second pre-editing operation is an editing operation before the light interaction message is transmitted. The second client edits and saves the custom part of the second field according to an editing operation of the BIB user on the second custom interface 161. In this embodiment, the custom part of the second field is the custom prefix of the second user account. As shown in FIG. 17C, the custom part of the second field is, for example, "shoulder".

For example, the number of characters in the custom part of the second field is limited, for example, is 8 at most.

As shown in FIG. 17C, after the second user taps a Done button 162, the second client saves the custom part of the second field, and synchronizes the custom part of the second field to the server and a first client corresponding to a first user account who has a friend relationship with the second user account.

To sum up, in the method provided in this embodiment, by providing the custom function of the second field, the first user cannot predict the second field customized by the second user, which improves the interest of the light interaction message and improves the frequency of interaction between the first user account and the second user account.

In some embodiments, the first client and/or the second client further customizes the action description field. The first client and/or the second client displays a third custom interface, and obtains the action description field through pre-editing in response to a third pre-editing operation on the third custom interface. For example, the action description field includes: patting, hugging, kissing, touching, hitting, etc. For example, the number of characters in the custom part of the action description field is limited, for example, is 3 at most.

Figure 18:
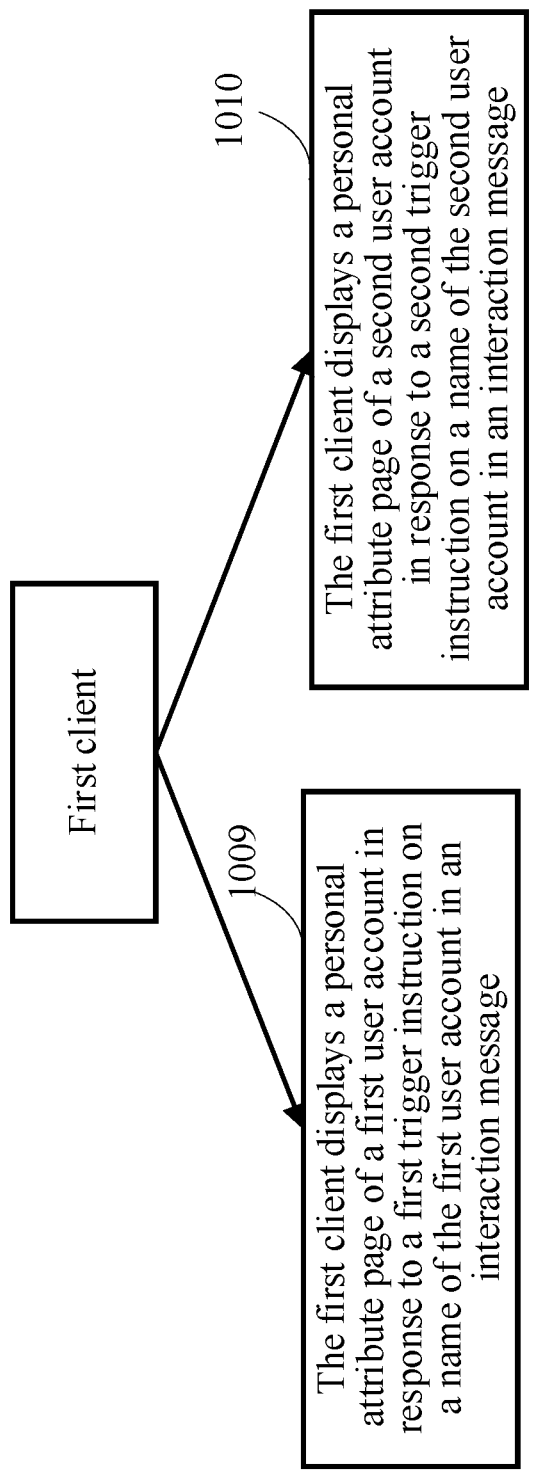
FIG. 18 is a flowchart of a message transmission/receiving method according to an exemplary embodiment of this application.

In an embodiment based on the above embodiments, the method further includes the following step 1009 or step 1010, as shown in FIG. 18:

Step 1009. The first client displays a personal attribute page of a first user account in response to a first trigger instruction on a name of the first user account in an interaction message.

Figures 19A, 19B:
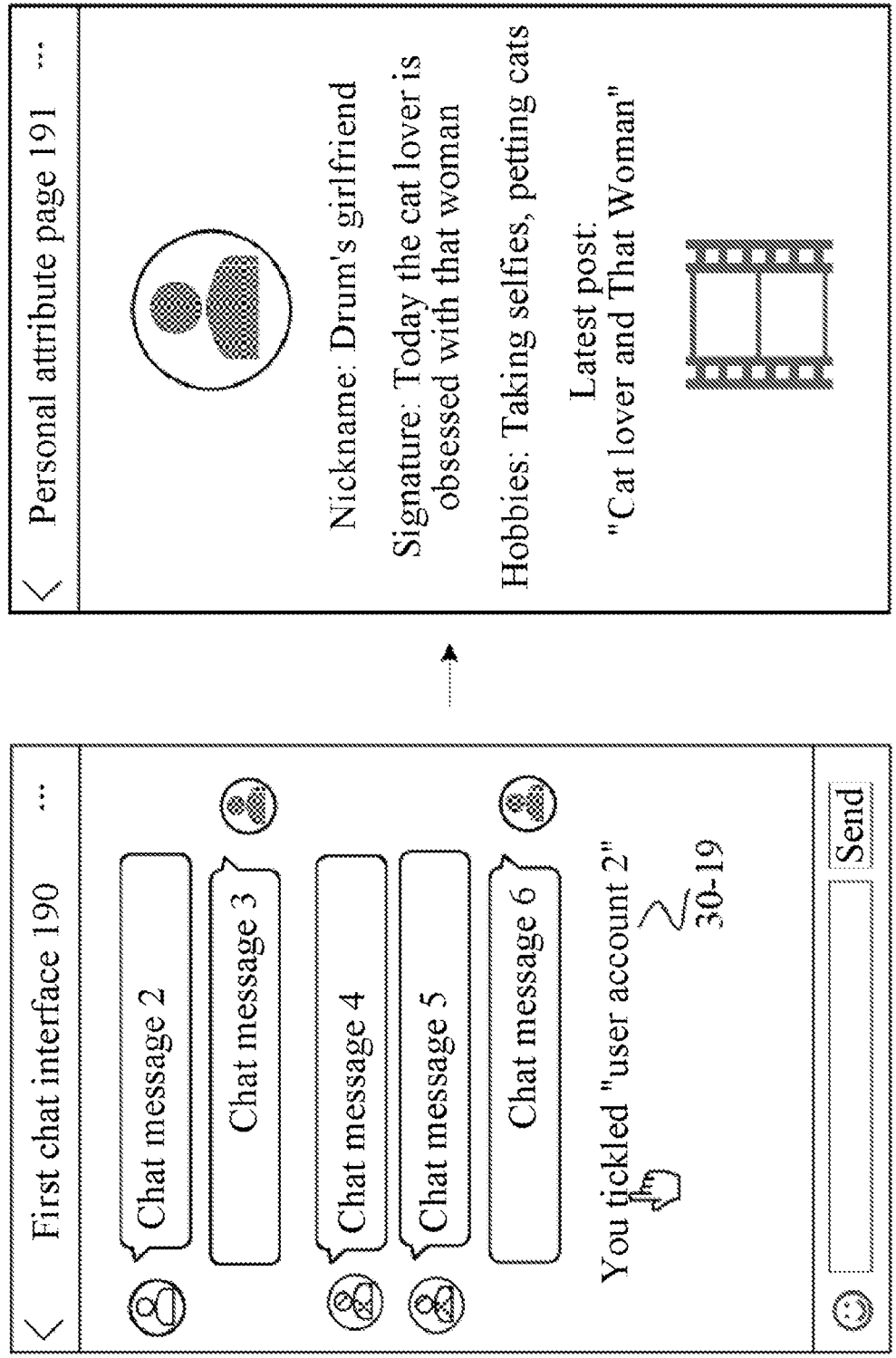
FIG. 19A and FIG. 19B are schematic interface diagrams of a personal attribute page according to an exemplary embodiment of this application.

The light interaction message includes names of two user accounts, such as the name of the first account and the name of the second account. When the user taps on the name of the first user account in the light interaction message, a first trigger instruction is triggered on the first client, and the first client displays the personal attribute page of the first user account according to the first trigger instruction. As shown in FIG. 19A and FIG. 19B, when the user taps "You" in a light interaction message 30-19 in a first chat interface 90, the first client displays a personal attribute page 910. As shown in FIG. 19B, the personal attribute page 910 of the first user account displays at least one of the following information: name, account, profile photo, signature, gender, phone, QR code, album, and personal space of the first user account.

Step 1010. The first client displays a personal attribute page of a second user account in response to a second trigger instruction on a name of the second user account in an interaction message.

Similarly, when the user taps on the name of the second user account in the light interaction message, a second trigger instruction is triggered on the first client, and the first client displays the personal attribute page of the second user account according to the second trigger instruction.

For example, for any client, when a light interaction message transmitted by the client or another client is displayed in a chat window interface of the client, the client displays the message. a personal attribute page for the user account in response to a trigger instruction on the name of the user account in the light interaction message.

To sum up, in the method provided by this embodiment, in response to a trigger instruction on a name of a user account in a light interaction message, a client displays a human-machine interaction mode that allows for quick viewing of a personal attribute page of a user account, thereby improving the efficiency of human-machine interaction.

Figure 20:
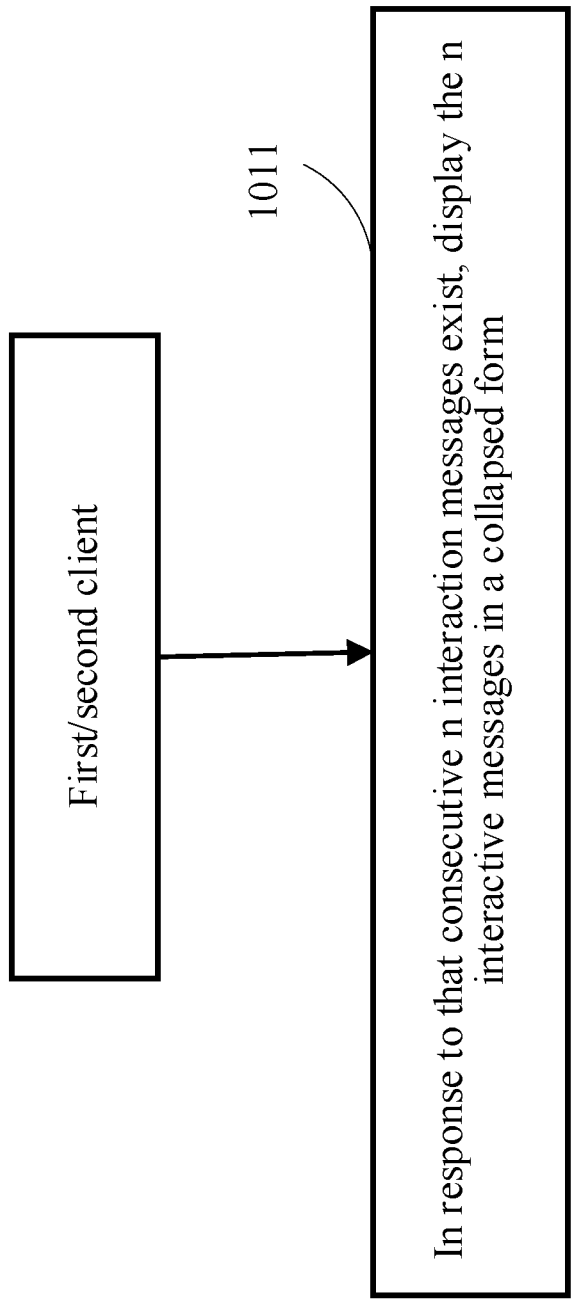
FIG. 20 is a flowchart of a message transmission/receiving method according to an exemplary embodiment of this application.

In an embodiment based on the above embodiments, the method further includes the following step 1011, as shown in FIG. 20:

Step 1011. In response to a determination that consecutive n interaction messages exist, display the n interactive messages in a collapsed form.

For any client, when there are consecutive n light interaction messages in a chat window interface of the client, all or a part of then light interaction messages may be displayed in a collapsed form according to a collapse policy. Collapsing may also be referred to as hiding or not showing. By displaying a plurality of continuous light interaction messages in a collapsed form, the displaying of unnecessary light interaction messages can be avoided, thereby saving computing resources.

For example, the collapse policy includes at least one of the following policies: a read collapse policy, or an interrupted collapse policy.

1. Read Collapse Policy:

In response to a determination that consecutive n light interaction messages exist in the first chat window interface and the n light interaction messages are all in a read state, the first client displays all or a part of the n light interaction messages in a collapsed form. n is an integer greater than 1. Similarly, in response to a determination that consecutive n light interaction messages exist in the second chat window interface and the n light interaction messages are all in a read state, the second client displays all or a part of the n light interaction messages in a collapsed form. n is an integer greater than 1.

Figure 21:
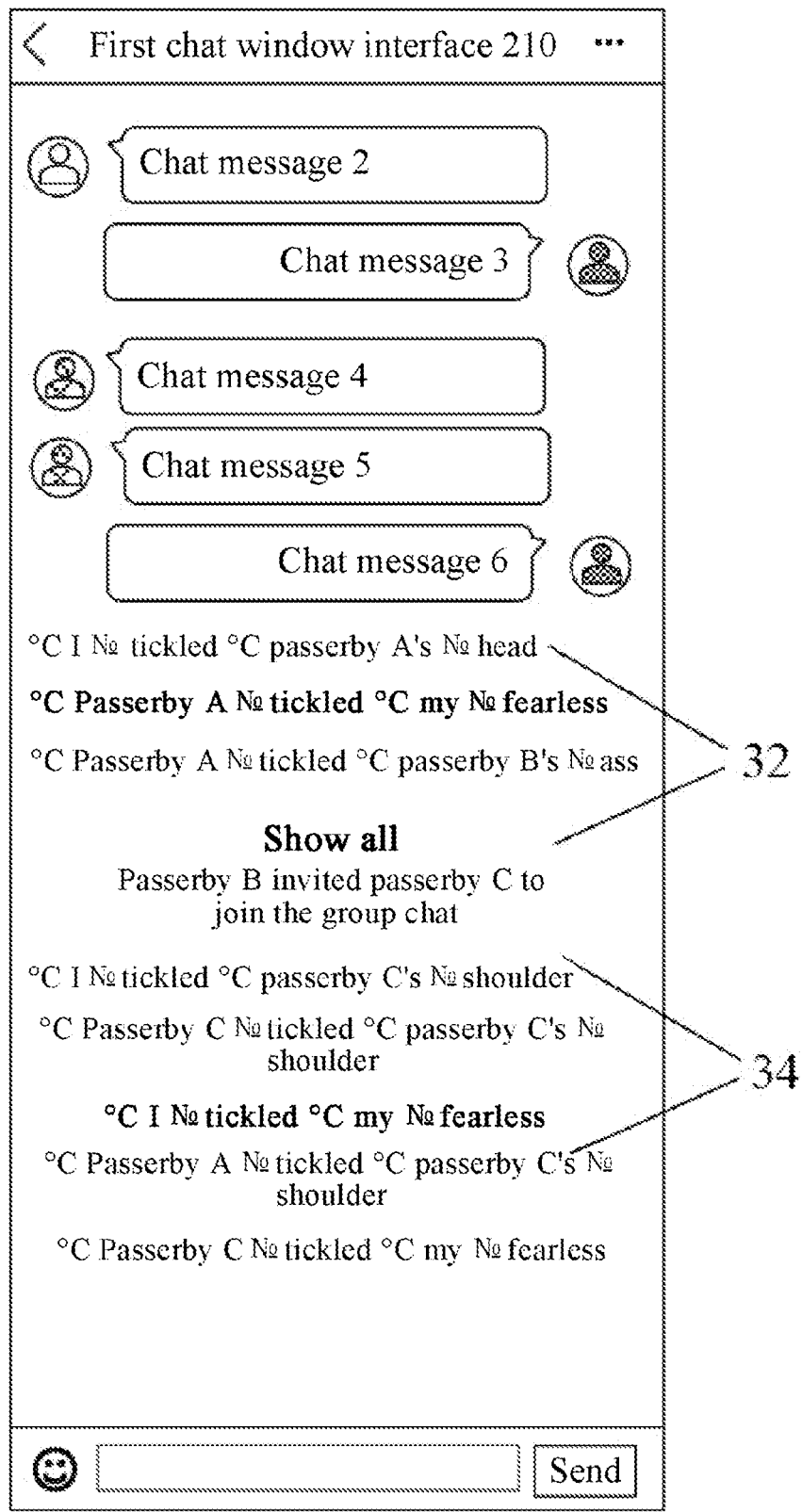
FIG. 21 is a schematic interface diagram of a read collapse policy according to an exemplary embodiment of this application.

As shown in FIG. 21, when there are five consecutive light interaction messages 32 in the read state in a first chat window interface 210, the first client displays the last two light interaction messages among the five light interaction messages 32 in a collapsed form (i.e., displays the first three of the five consecutive light interaction messages in the read state, and does not display the last two of the five consecutive light interaction messages). A "Show all" button is displayed at the folded two light interaction messages (i.e., after the third light interaction message), and when the user taps the "Show all" button, the two light interaction messages can be displayed.

However, for five consecutive light interaction messages 34, if the first four light interaction messages are in the read state and the last light interaction message is in an unread state, the five light interaction messages are not collapsed.

2. Interrupted Collapse Policy:

In response to a determination that consecutive m light interaction messages exist in the first chat window interface and the m light interaction messages are earlier than a latest chat message, the first client displays all or a part of the m light interaction messages in a collapsed form. m is an integer greater than 1. Similarly, in response to a determination that consecutive m light interaction messages exist in the second chat window interface and the m light interaction messages are earlier than a latest chat message, the second client displays all or a part of the m light interaction messages in a collapsed form. m is an integer greater than 1.

Figure 22:
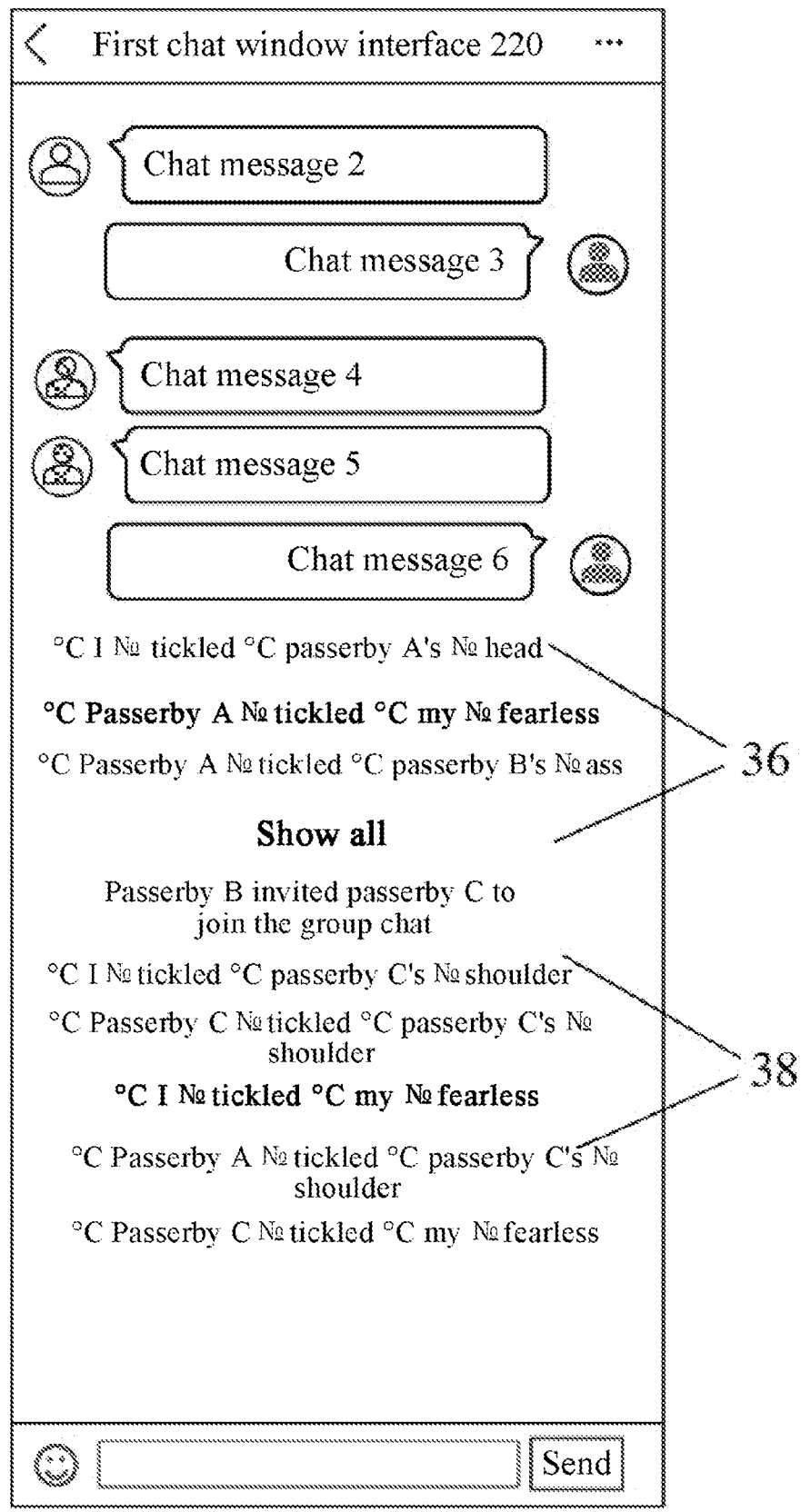
FIG. 22 is a schematic interface diagram of an interrupted collapse policy according to an exemplary embodiment of this application.

As shown in FIG. 22, when there are a plurality of (e.g., more than five) consecutive light interaction messages 36 that are interrupted in a first chat window interface 220, the first three light interaction messages are displayed, and the other light interaction messages are displayed in a collapsed form. A "Show all" button is displayed at the folded other light interaction messages (i.e., after the third light interaction message), and when the user taps the "Show all" button, the other light interaction messages can be displayed. The plurality of light interaction messages 36 are interrupted by a system message "The passerby B invited the passerby C to join the group chat". Because a plurality of light interaction messages 38 are not interrupted, the plurality of light interaction messages 38 are not collapsed.

For the above collapse policy, the following features may be included:

1. If two light interaction messages are interrupted by another chat message or another system message (collectively referred to as another message, which is different from the type of the light interaction message), counting is restarted from the first light interaction after the another message.

2. If there is a time division stamp (such as 13:20) between two light interaction messages, the time division stamp does not affect the continuous counting between the two light interaction messages, and such a time division stamp is also ignored when the collapsed messages are unfolded for displaying.

3. A plurality of consecutive light interaction messages that are not interrupted by any other message are stored in a same database (DB) message, where the database is a database configured to store messages in a client. There are multiple sub-messages in one DB message, and each sub-message is used for storing a light interaction message. After using the DB message to store a light interaction message, if the client receives another light interaction message and there is no interruption caused by another message, the client uses a method of updating the message content to store the another light interaction message to the DB message; if the client receives another light interaction message and there is an interruption caused by another message, the client creates a new DB message to store the another light interaction message. Therefore, according to the embodiments of this application, the message transmission method further includes: establishing a database message to store the interaction message in response to a determination that the interaction message is a first interaction message in the first chat window interface; for each new interaction message after the interaction message in the first chat window interface, updating, in response to a determination that no non-interaction message exists between the new interaction message and a previous interaction message of the new interaction message, a database message where the previous interaction message is located, to store the new interaction message in the database message where the previous interaction message is located; and establishing a new database message to store the new interaction message, in response to a determination that a non-interaction message exists between the new interaction message and the previous interaction message, where the interaction message is a light interaction message, and the non-interaction message is a non-light interaction message. When displaying at least one interaction message, the client or terminal splits a database message where at least one interaction message is located, to render and display the at least one interaction message in the first chat window interface. In this way, the implementation of the collapse operation and the rendering of a plurality of consecutive light interaction messages by the client or computer device are facilitated.

4. The read state of the light interaction message may be updated according to a sliding status of the user on the client, or may be updated according to whether the avatar animation of the second user account has been displayed. In one example, after the avatar animation of the second user account is displayed in the client of the message recipient, the state of the light interaction message is set to the read state. In another example, when the display position of the light interaction message at below 20% of the interface of the screen from the top down and the avatar animation of the second user account is displayed, the state of the light interaction message is set to the read state. The purpose is (1) to ensure that the user has really read the message; and (2) to ensure that the avatar of the person being tickled exists in the part of the screen in front of the light interaction message, so as not to be missed when the avatar animation of the person being tickled is displayed, especially when sliding to view the context.

Figure 23:
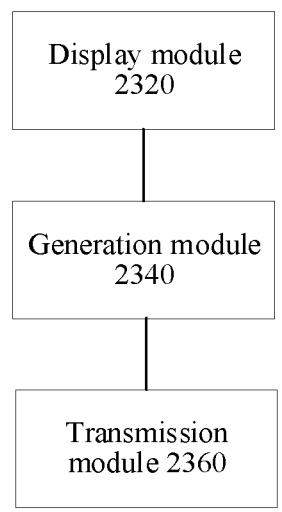
FIG. 23 is a block diagram of a message transmission apparatus according to an exemplary embodiment of this application.

FIG. 23 is a block diagram of a message transmission apparatus according to an exemplary embodiment of this application. The apparatus is logged in with a first user account. The apparatus includes:

a display module 2320, configured to display an avatar of a second user account in a first user interface;

a generation module 2340, configured to generate, in response to an interaction instruction triggered on the avatar of the second user account, an interaction message according to a first field corresponding to the first user account, an action description field used for indicating an action performed by the first user account on the second user account, and a second field corresponding to the second user account; and a transmission module 2360, configured to transmit the interaction message to a second client logged in with the second user account.

In an exemplary design of this application, at least one of the first field, the action description field, and the second field is a custom field pre-edited for the interaction message.

In an exemplary design of this application, the first field is the custom field, the first field includes: a name of the first user account, and at least one of a custom prefix or a custom suffix of the first user account; and the second field is the custom field, the second field includes: a name of the second user account, and at least one of a custom prefix or a custom suffix of the second user account.

In an exemplary design of this application, the apparatus further includes an editing module. The display module 2320 is configured to display a first custom interface; and the editing module is configured to obtain a custom part in the first field through pre-editing in response to a first pre-editing operation on the first custom interface.

In an exemplary design of this application, the display module 2320 is configured to display a third custom interface; and the editing module is configured to obtain a custom part in the action description field through pre-editing in response to a third pre-editing operation on the third custom interface.

In an exemplary design of this application, the generation module 2340 is configured to generate the interaction message in response to a double-tap instruction triggered on the avatar of the second user account.

In an exemplary design of this application, the first user interface is a non-chat window interface, and the non-chat window interface includes at least one of a personal attribute interface, an address book interface, a group member display interface, a single chat member display interface, or a social circle interaction interface; and the display module 2320 is further configured to display the interaction message in a target area which is based on the avatar of the second user account in the non-chat window interface.

In an exemplary design of this application, the display module 2320 is further configured to cancel displaying of the interaction message in the non-chat window interface, in response to a display duration of the interaction message reaching a threshold.

In an exemplary design of this application, the first user interface is a first chat window interface; and the display module 2320 is further configured to display a message content of the interaction message in the first chat window interface, a message display manner of the interaction message being different from a message display manner of a chat message.

In an exemplary design of this application, the display module 2320 is further configured to, in response to a determination that a content displayed in the first chat window interface does not include a latest message content, automatically scroll the first chat window interface to the latest message content, to display the latest message content, the latest message content including the message content of the interaction message.

In an exemplary design of this application, the display module 2320 is further configured to, in response to a determination that consecutive n interaction messages exist in the first chat window interface and the n interaction messages are all in a read state, display all or a part of the n interaction messages in a collapsed form, n being an integer greater than 1; or in response to a determination that consecutive m interaction messages exist in the first chat window interface and the m interaction messages are earlier than a latest chat message, display all or a part of the m interaction messages in a collapsed form, m being an integer greater than 1.

Figure 24:
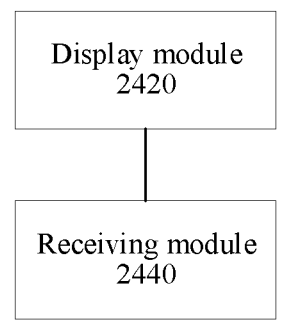
FIG. 24 is a block diagram of a message receiving apparatus according to an exemplary embodiment of this application.

FIG. 24 is a block diagram of a message receiving apparatus according to an exemplary embodiment of this application. The apparatus is logged in with a second user account. The apparatus includes:

a display module 2420, configured to display a second chat window interface, chat members in the second chat window interface including a first user account and the second user account; and a receiving module 2440, configured to receive an interaction message transmitted by the first user account to the second user account, a message content of the interaction message including: a first field corresponding to the first user account, an action description field used for indicating an action performed by the first user account on the second user account, and a second field corresponding to the second user account, the display module 2420 being further configured to display the interaction message in the second chat window interface.

In an exemplary design of this application, at least one of the first field, the action description field, and the second field is a custom field pre-edited for the interaction message.

In an exemplary design of this application the first field is the custom field, the first field includes: a name of the first user account, and at least one of a custom prefix or a custom suffix of the first user account; and the second field is the custom field, the second field includes: a name of the second user account, and at least one of a custom prefix or a custom suffix of the second user account.

In an exemplary design of this application, the apparatus further includes an editing module. The display module 2420 is further configured to display a second custom interface; and the editing module is configured to obtain a custom part in the second field through pre-editing in response to a second pre-editing operation on the second custom interface.

In an exemplary design of this application, the display module 2420 is further configured to display a message content of the interaction message in the second chat window interface, a message display manner of the interaction message being different from a message display manner of a chat message.

In an exemplary design of this application, the display module 2420 is further configured to display the interaction message in the second chat window interface using a first message display manner, in response to a determination that the interaction message is an unread message; and display the interaction message in the second chat window interface using a second message display manner, in response to a determination that the interaction message is a read message.

the first message display manner is different from the second message display manner.

In an exemplary design of this application, chat members of the second chat window interface further include a third user account, the receiving module 2440 is further configured to receive another interaction message transmitted by the chat member to the third user account, and the display module 2420 is further configured to display the another interaction message in the second chat window interface, a message display manner of the another interaction message being different from the message display manner of the interaction message.

In an exemplary design of this application, the display module 2420 is further configured to display an avatar animation of the avatar of the second user account in an avatar area corresponding to a chat message transmitted by the second user account and closest to the interaction message.

In an exemplary design of this application, the display module 2420 is further configured to, in response to a determination that consecutive n interaction messages exist in the second chat window interface and the n interaction messages are all in a read state, display all or a part of the n interaction messages in a collapsed form; or the display module 2420 is further configured to, in response to a determination that consecutive m interaction messages exist in the second chat window interface and the m interaction messages are earlier than a latest chat message, display all or a part of the m interaction messages in a collapsed form.

The message transmission apparatus provided in the above embodiments is illustrated with an example of division of the above functional modules. In actual application, the functions may be allocated to and completed by different functional modules according to requirements, that is, the internal structure of the device is divided into different functional modules, to implement all or some of the functions described above. In addition, the message transmission apparatus and message transmission method embodiments provided in the above embodiments belong to the same conception. For specific implementation processes, reference may be made to the method embodiments, and the details will not be described herein again.

Similarly, the message receiving apparatus provided in the above embodiments is illustrated with an example of division of the above functional modules. In actual application, the functions may be allocated to and completed by different functional modules according to requirements, that is, the internal structure of the device is divided into different functional modules, to implement all or some of the functions described above. In addition, the message receiving apparatus and message receiving method embodiments provided in the above embodiments belong to the same conception. For specific implementation processes, reference may be made to the method embodiments, and the details will not be described herein again.

This application further provides a computer device (a terminal or a server), including a processor and a memory, the memory storing at least one instruction, the at least one instruction being loaded and executed by the processor to implement the message transmission method or the message receiving method provided in the above method embodiments. The computer device may be a computer device provided in FIG. 25.

Figure 25:
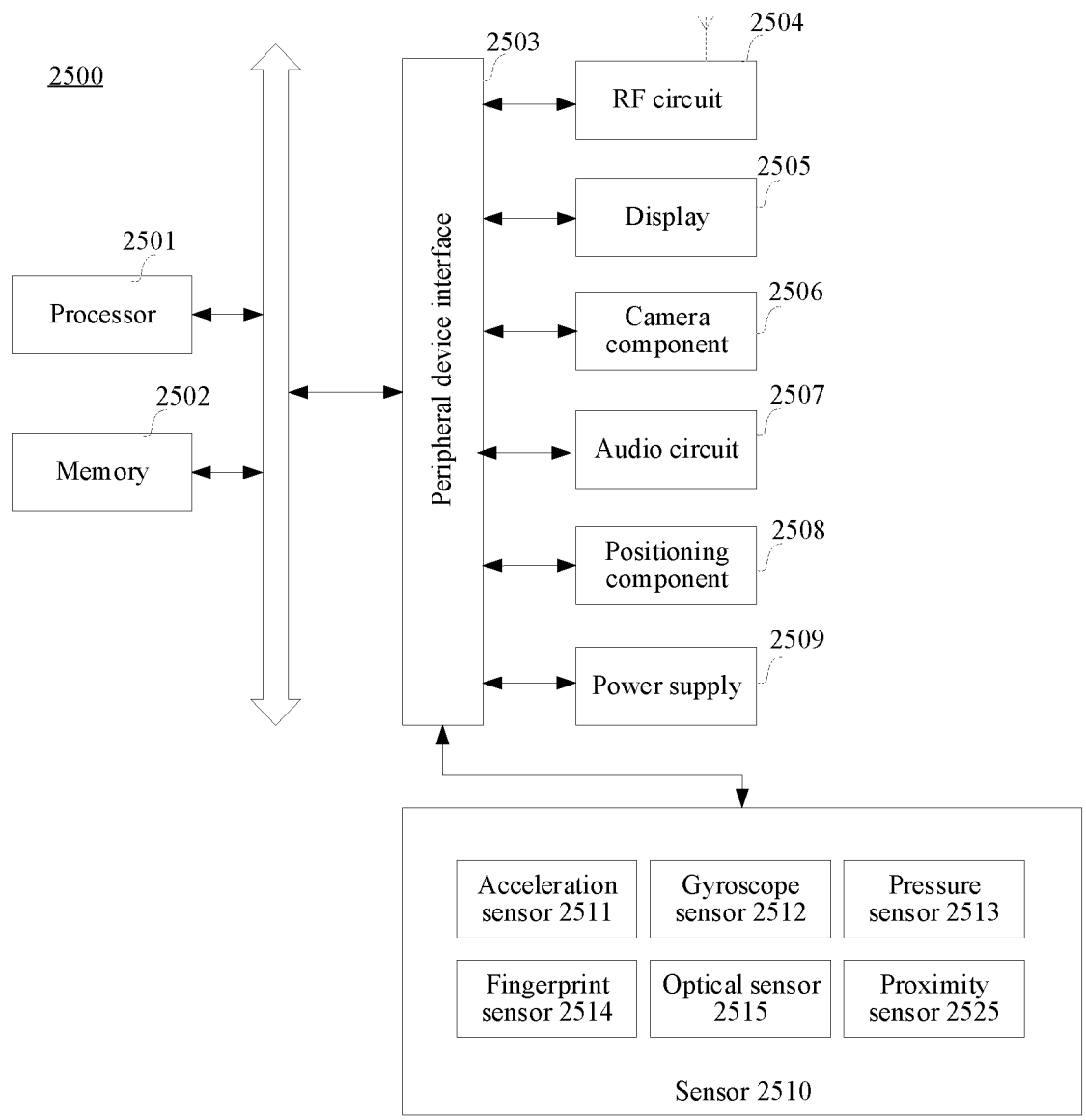
FIG. 25 is a block diagram of a terminal according to an exemplary embodiment of this application.

FIG. 25 is a structural block diagram of a computer device 2500 according to an exemplary embodiment of this application. The computer device 2500 may be a smartphone, a tablet computer, a Moving Picture Experts Group Audio Layer III (MP3) player, a Moving Picture Experts Group Audio Layer IV (MP4) player, a notebook computer, or a desktop computer. The computer device 2500 may also be referred to as user equipment (UE), a portable computer device, a laptop computer device, a desktop computer device, or another name.

Generally, the computer device 2500 includes a processor 2501 and a memory 2502.

The memory 2502 may include one or more computer-readable storage media that may be non-transitory. The memory 2502 may further include a high-speed random access memory and a non-volatile memory, for example, one or more magnetic disk storage devices or flash memory devices. In some embodiments, a non-transitory computer-readable storage medium in the memory 2502 is configured to store at least one instruction, the at least one instruction being configured to be executed by the processor 2501 to implement the message transmission method provided in the method embodiments of this application.

In some embodiments, the computer device 2500 further includes a peripheral interface 2503 and at least one peripheral. The processor 2501, the memory 2502, and the peripheral interface 2503 may be connected by using a bus or a signal cable. Each peripheral may be connected to the peripheral interface 2503 by using a bus, a signal cable, or a circuit board. Specifically, the peripheral device includes: at least one of a radio frequency (RF) circuit 2504, a touch display 2505, a camera component 2506, an audio circuit 2507, a positioning component 2508, or a power supply 2509.

The peripheral device interface 2503 may be configured to connect the at least one peripheral device related to input/output (I/O) to the processor 2501 and the memory 2502. In some embodiments, the processor 2501, the memory 2502, and the peripheral interface 2503 are integrated on the same chip or the same circuit board. In some other embodiments, any or both of the processor 2501, the memory 2502, and the peripheral interface 2503 may be implemented on an independent chip or circuit board, which is not limited in this embodiment.

The display 2505 is configured to display a user interface (UI). The UI may include a graph, a text, an icon, a video, and any combination thereof. When the display screen 2505 is a touch display screen, the display screen 2505 is further capable of collecting touch signals on or above a surface of the display screen 2505. The touch signal may be inputted, as a control signal, to the processor 2501 for processing. In this case, the display screen 2505 may be further configured to provide a virtual button and/or a virtual keyboard, which is also referred to as a soft button and/or a soft keyboard.

In some embodiments, the computer device 2500 may further include one or more sensors 2510. The one or more sensors 2510 include, but are not limited to: an acceleration sensor 2511, a gyro sensor 2512, a pressure sensor 2513, a fingerprint sensor 2514, an optical sensor 2515, and a proximity sensor 2525.

A person skilled in the art may understand that the structure shown in FIG. 25 does not constitute any limitation on the computer device 2500, and the computer device may include more components or fewer components than those shown in the figure, or some components may be combined, or a different component deployment may be used.

The memory further includes one or more programs. The one or more programs are stored in the memory. The one or more programs include a program for performing the message transmission method or the message receiving method provided in the embodiments of this application.

This application further provides a computer-readable storage medium (e.g., a non-transitory computer-readable storage medium), the storage medium storing at least one instruction, the at least one instruction being loaded and executed by a processor to implement the message transmission method or the message receiving method according to the above method embodiments.

This application further provides a computer program product, and the computer program product, when run on a computer, causes the computer to perform the message transmission method or the message receiving method according to the above method embodiments.

The sequence numbers of the above embodiments of this application are merely for description purpose, and are not intended to indicate the preference among the embodiments.

A person of ordinary skill in the art may understand that all or some of the steps of the above embodiments may be implemented by hardware, or may be implemented a program instructing related hardware. The program may be stored in a computer-readable storage medium. The storage medium may be: a ROM, a magnetic disk, or an optical disc.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs interaction message generation and/or avatar display. In practical application, the foregoing functions may be allocated to and completed by different functional modules according to requirements, that is, an inner structure of a device is divided into different functional modules to implement all or a part of the functions described above.

What is claimed is:

1. A message transmission method performed at a first device that is logged in with a first user account, the method comprising:
displaying an avatar of a second user account in a first user interface of the first device wherein the first user interface is a first chat window interface;
in response to an interaction instruction triggered on the avatar of the second user account, generating an interaction message according to (i) a first field corresponding to the first user account, (ii) an action description field used for indicating an action performed by the first user account on the second user account, and (iii) a second field corresponding to the second user account; and
transmitting the interaction message to a second device that is logged in with the second user account;
establishing a database message to store the interaction message; and
for each new interaction message after the interaction message in the first chat window interface:
in response to a determination that no non-interaction message exists between the new interaction message and a previous interaction message of the new interaction message, updating the database message where the previous interaction message is located to store the new interaction message in the database message where the previous interaction message is located, and
in response to a determination that a non-interaction message exists between the new interaction message and the previous interaction message, establishing a new database message to store the new interaction message.

2. The method according to claim 1, wherein at least one of the first field, the action description field, and the second field is a custom field pre-edited for the interaction message.

3. The method according to claim 2, wherein
the first field is the custom field; and
a user-customized entry is a custom prefix or a custom suffix that provides a description of the first user account, wherein the description is related to the action.

4. The method according to claim 2, wherein
the second field is the custom field; and
a user-customized entry is a custom prefix or a custom suffix that provides a description of the second user account, wherein the description is related to the action.

5. The method according to claim 2, further comprising:
displaying a first custom interface, distinct from the first user interface; and
obtaining a custom part in the first field through pre-editing in response to a first pre-editing operation on the first custom interface.

6. The method according to claim 2, further comprising:
displaying a third custom interface; and
obtaining a custom part in the action description field through pre-editing in response to a third pre-editing operation on the third custom interface.

7. The method according to claim 1, wherein generating the interaction instruction comprises:
generating the interaction message in response to a double-tap instruction triggered on the avatar of the second user account.

8. The method according to claim 1, wherein
the first user interface is a non-chat window interface, and the non-chat window interface comprises at least one of a personal attribute interface, an address book interface, a group member display interface, a single chat member display interface, or a social circle interaction interface; and
the method further comprises: displaying the interaction message in a target area of the non-chat window interface, wherein the target area is determined based on the avatar of the second user account in the non-chat window interface.

9. The method according to claim 8, further comprising:
canceling displaying of the interaction message in the non-chat window interface, in response to a display duration of the interaction message reaching a threshold duration.

10. The method according to claim 1, wherein the method further comprises:
displaying a message content of the interaction message in the first chat window interface in a message display manner that is different from a message display manner of a chat message.

11. The method according to claim 10, wherein displaying the message content of the interaction message in the first chat window interface comprises:
in response to a determination that a latest message content in a chat message list is not displayed in the first chat window interface, automatically scrolling the chat message list to the latest message content to display the latest message content in the first chat window interface, the latest message content comprising the message content of the interaction message.

12. The method according to claim 10, further comprising:
in response to a determination that consecutive n interaction messages exist in the first chat window interface and the n interaction messages are all in a read state, displaying all or a part of the n interaction messages in a collapsed form, wherein n is an integer greater than 1; or
in response to that consecutive m interaction messages exist in the first chat window interface and the m interaction messages are earlier than a latest chat message, displaying all or a part of the m interaction messages in a collapsed form, wherein m is an integer greater than 1.

13. An electronic device that is logged in with a first user account, the electronic device comprising:
one or more processors; and
memory storing one or more programs, the one or more programs comprising instructions that, when executed by the one or more processors, cause the one or more processors to perform operations comprising:
displaying an avatar of a second user account in a first user interface of a first device, wherein the first user interface is a first chat window interface;
in response to an interaction instruction triggered on the avatar of the second user account, generating an interaction message according to (i) a first field corresponding to the first user account, (ii) an action description field used for indicating an action performed by the first user account on the second user account, and (iii) a second field corresponding to the second user account;
transmitting the interaction message to a second device that is logged in with the second user account;

establishing a database message to store the interaction message; and for each new interaction message after the interaction message in the first chat window interface:

in response to a determination that no non-interaction message exists between the new interaction message and a previous interaction message of the new interaction message, updating the database message where the previous interaction message is located to store the new interaction message in the database message where the previous interaction message is located, and in response to a determination that a non-interaction message exists between the new interaction message and the previous interaction message, establishing a new database message to store the new interaction message.

14. The electronic device according to claim 13, wherein at least one of the first field, the action description field, and the second field is a custom field pre-edited for the interaction message.

15. The electronic device according to claim 14, the operations further comprising:

displaying a first custom interface, distinct from the first user interface; and obtaining a custom part in the first field through pre-editing in response to a first pre-editing operation on the first custom interface.

16. The electronic device according to claim 14, the operations further comprising:

displaying a third custom interface; and obtaining a custom part in the action description field through pre-editing in response to a third pre-editing operation on the third custom interface.

17. A non-transitory computer-readable storage medium, storing a computer program, the computer program, when executed by one or more processors of an electronic device, cause the one or more processors to perform operations comprising:

displaying an avatar of a second user account in a first user interface of a first device, wherein the first user interface is a first chat window interface;

in response to an interaction instruction triggered on the avatar of the second user account, generating an interaction message according to (i) a first field corresponding to the first user account, (ii) an action description field used for indicating an action performed by the first user account on the second user account, and (iii) a second field corresponding to the second user account;

transmitting the interaction message to a second device that is logged in with the second user account;

establishing a database message to store the interaction message; and for each new interaction message after the interaction message in the first chat window interface:

in response to a determination that no non-interaction message exists between the new interaction message and a previous interaction message of the new inter-action message, updating the database message where the previous interaction message is located to store the new interaction message in the database message where the previous interaction message is located, and in response to a determination that a non-interaction message exists between the new interaction message and the previous interaction message, establishing a new database message to store the new interaction message.

18. The non-transitory computer-readable storage medium according to claim 17, wherein the operations further comprise:

displaying a message content of the interaction message in the first chat window interface in a message display manner that is different from a message display manner of a chat message.

\* \* \* \* \*